(12) United States Patent
Ake

(10) Patent No.: US 7,838,808 B1
(45) Date of Patent: Nov. 23, 2010

(54) LASER LIGHT DETECTOR WITH REFLECTION REJECTION ALGORITHM

(75) Inventor: DuWain K. Ake, Beavercreek, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 581 days.

(21) Appl. No.: 11/881,121

(22) Filed: Jul. 25, 2007

Related U.S. Application Data

(63) Continuation-in-part of application No. 11/414,383, filed on Apr. 28, 2006, now Pat. No. 7,323,673, which is a continuation-in-part of application No. 11/303,488, filed on Dec. 16, 2005, now abandoned, which is a continuation-in-part of application No. 11/082,041, filed on Mar. 16, 2005, now abandoned.

(51) Int. Cl.
*G01J 1/44* (2006.01)
*H01J 40/14* (2006.01)
*H03F 3/08* (2006.01)

(52) U.S. Cl. ............... 250/214 R; 250/216; 356/141.1; 356/152.2

(58) Field of Classification Search ............ 250/214 R, 250/214.1, 208.1, 216; 356/5, 28, 152, 141, 356/141.1–141.5, 152.1–152.3
See application file for complete search history.

(56) References Cited

U.S. PATENT DOCUMENTS

| 3,017,046 A | 1/1962 | Runci et al. |
|---|---|---|
| 3,469,919 A | 9/1969 | Zellner |
| 3,708,232 A | 1/1973 | Walsh |
| 3,727,332 A | 4/1973 | Zimmer |
| 3,790,277 A | 2/1974 | Hogan |
| 3,813,171 A | 5/1974 | Teach et al. |
| 3,887,012 A | 6/1975 | Scholl et al. |
| 3,894,230 A | 7/1975 | Rorden et al. |
| 3,900,073 A | 8/1975 | Crum |
| 3,997,071 A | 12/1976 | Teach |
| 4,029,415 A | 6/1977 | Johnson |

(Continued)

FOREIGN PATENT DOCUMENTS

GB    2 101 077 A    1/1983

OTHER PUBLICATIONS

"360 degree Machine Guidance" and "Depthmaster" sales literature, by Laser Alignment, Inc. (exact date unknown, but known to be before Jun. 12, 1989).

(Continued)

*Primary Examiner*—Thanh X Luu
*Assistant Examiner*—Francis M Legasse, Jr.
(74) *Attorney, Agent, or Firm*—Frederick H. Gribbell

(57) ABSTRACT

A modulated laser light detector that converts laser light energy into electrical signals which exhibit a frequency that is substantially the same as the laser light modulation frequency, in which these signals allow the detector unit to determine a position where the laser light is impacting upon a photodiode array. A superheterodyne receiver circuit is used to provide high gain at an improved signal-to-noise ratio to improve the range at which the modulated laser light signal can be reliably detected. Various types of signal detection circuits are available. Various processing algorithms are disclosed, including one which rejects laser light strikes that are due to reflections, rather than due to a direct strike from the laser transmitter.

13 Claims, 23 Drawing Sheets

U.S. PATENT DOCUMENTS

| | | |
|---|---|---|
| 4,034,490 A | 7/1977 | Teach |
| 4,040,738 A | 8/1977 | Wagner |
| 4,050,171 A | 9/1977 | Teach |
| 4,052,600 A | 10/1977 | Wertheimer |
| 4,129,224 A | 12/1978 | Teach |
| 4,162,708 A | 7/1979 | Johnson |
| 4,231,700 A | 11/1980 | Studebaker |
| 4,273,196 A | 6/1981 | Etsusaki et al. |
| 4,393,606 A | 7/1983 | Warnecke |
| 4,413,684 A | 11/1983 | Duncklee |
| 4,477,168 A | 10/1984 | Hosoe |
| 4,491,927 A | 1/1985 | Bachmann et al. |
| 4,535,699 A | 8/1985 | Buhler |
| 4,604,025 A | 8/1986 | Hammoud |
| 4,674,870 A | 6/1987 | Cain et al. |
| 4,676,634 A | 6/1987 | Petersen |
| 4,726,682 A | 2/1988 | Harms et al. |
| 4,732,471 A | 3/1988 | Cain et al. |
| 4,756,617 A | 7/1988 | Cain et al. |
| 4,764,410 A | 8/1988 | Grzywinski |
| 4,766,023 A | 8/1988 | Lu |
| 4,829,418 A | 5/1989 | Nielsen et al. |
| 4,884,939 A | 12/1989 | Nielsen |
| 4,907,874 A | 3/1990 | Ake |
| 4,912,643 A | 3/1990 | Beirne |
| 4,976,538 A | 12/1990 | Ake |
| 5,159,400 A | 10/1992 | Takeda et al. |
| 5,174,385 A | 12/1992 | Shinbo et al. |
| 5,254,388 A | 10/1993 | Melby et al. |
| 5,343,033 A | 8/1994 | Cain |
| 5,471,049 A | 11/1995 | Cain |
| 5,486,690 A | 1/1996 | Ake |
| 5,528,498 A | 6/1996 | Scholl |
| 5,682,311 A | 10/1997 | Clark |
| 5,848,485 A | 12/1998 | Anderson et al. |
| 5,854,988 A | 12/1998 | Davidson et al. |
| 5,886,776 A | 3/1999 | Yost et al. |
| 5,925,085 A | 7/1999 | Kleimenhagen et al. |
| 5,950,141 A | 9/1999 | Yamamoto et al. |
| 5,960,378 A | 9/1999 | Watanabe et al. |
| 6,133,991 A | 10/2000 | Ake |
| 6,263,595 B1 | 7/2001 | Ake |
| 7,012,237 B1 | 3/2006 | Ake |
| 7,079,987 B2 | 7/2006 | Green |
| 7,224,473 B2 | 5/2007 | Zalusky |
| 2003/0058446 A1 | 3/2003 | Douglas |
| 2003/0174305 A1 | 9/2003 | Kasper et al. |
| 2003/0202172 A1 | 10/2003 | Douglas |
| 2005/0057746 A1* | 3/2005 | Takahashi et al. ...... 356/139.07 |

OTHER PUBLICATIONS

"Laser Control-Receiver LRE-180/360" sales literature, by MOBA Electronic (exact date unknown, but known to be before Jun. 12, 1989).

"A Lock-in Amplifier Primer," by Princeton Applied Research (1975).

"Explore the Lock-In Amplifier," by EG&G Princeton Applied Research, Scientific Instrument Group (1983).

"Laserplane Grade-Eye" sales literature, by Spectra-Physics (1985).

"What is a Lock-in Amplifier?" Technical Note TN 1000, by PerkinElmer Instruments (2000).

"The Analog Lock-in Amplifier," Technical Note TN 1002, by PerkinElmer Instruments (2000).

"Application Note #3 About Lock-In Amplifiers," by PerkinElmer Instruments (published by 2003).

"What Is a Lock-In Amplifier?" by Boston Electronics (published by 2003).

* cited by examiner

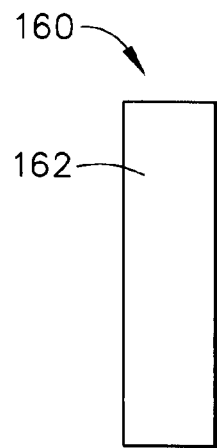
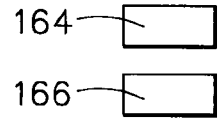
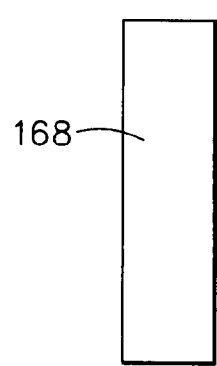
FIG. 3
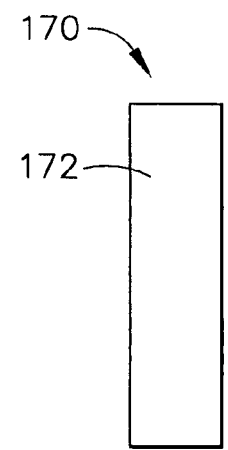
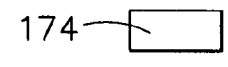
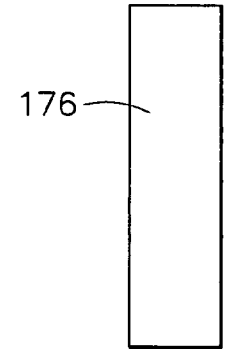
FIG. 4
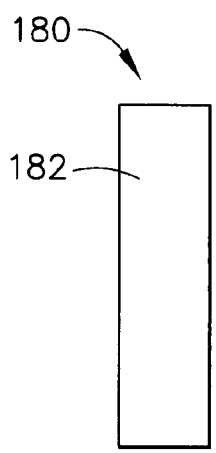
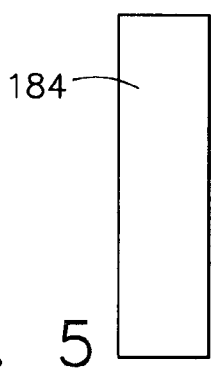
FIG. 5

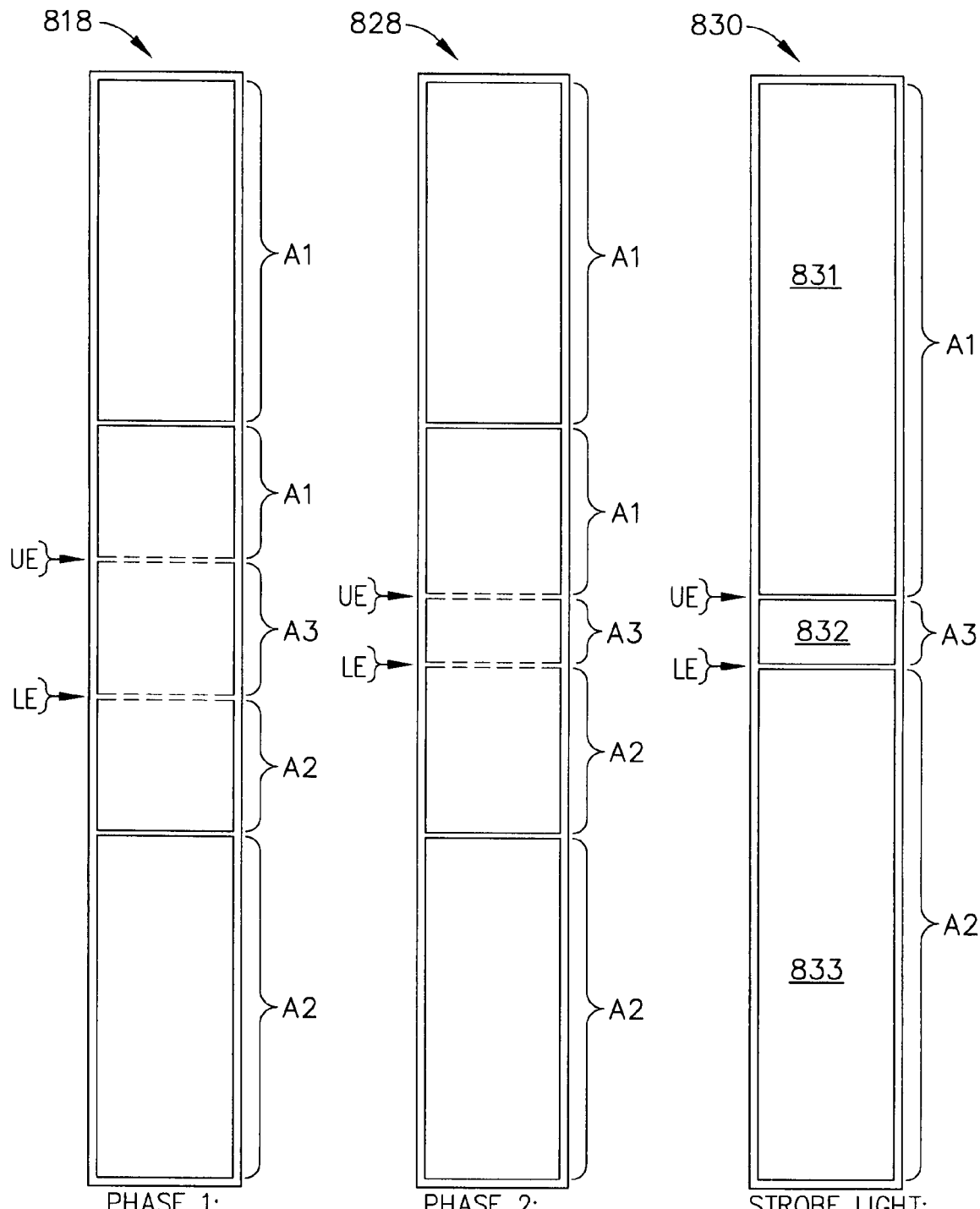

LASER LIGHT DETECTOR WITH REFLECTION REJECTION ALGORITHM

CROSS-REFERENCE TO RELATED APPLICATIONS

The present application is a continuation-in-part to application Ser. No. 11/414,383, titled "MODULATED LASER LIGHT DETECTOR WITH DISCRETE FOURIER TRANSFORM ALGORITHM," filed on Apr. 28, 2006; now U.S. Pat. No. 7,323,673 which is a continuation-in-part to application Ser. No. 11/303,488, titled "MODULATED LASER LIGHT DETECTOR WITH MORE EFFICIENT BEAM DETECTION ALGORITHM," filed on Dec. 16, 2005; now abandoned which is a continuation-in-part to application Ser. No. 11/082,041, titled "MODULATED LASER LIGHT DETECTOR WITH IMPROVED RANGE," filed on Mar. 16, 2005 now abandoned.

TECHNICAL FIELD

The present invention relates generally to laser light detectors and is particularly directed to laser light detectors of the type which detect modulated laser light energy. The invention is specifically disclosed as a modulated laser light detector that converts laser light energy into electrical signals which exhibit a frequency that is substantially the same as the laser light modulation frequency, and then signal conditions the electrical signals in a manner that allows the detector unit to determine a position where the laser light is impacting upon a photodiode array. The signal conditioning includes a mixer and a filter to improve the signal-to-noise ratio of the received signal, thereby improving the sensitivity or range of the detection portion of the laser light receiver. The invention determines the beam positions of the laser signals striking an array of photosensitive elements, and in some of the embodiments described herein, a software algorithm is used to assist in determining these beam positions. One of the embodiments uses a "software phase locked loop" algorithm; a second algorithm uses a sampling scheme to determine the RMS value of the signals at the IF frequency to determine an effective signal magnitude for each channel; and a third algorithm uses a sampling scheme and calculates a Discrete Fourier Transform based on the signals running at the IF frequency to determine an effective signal magnitude for each channel. An additional signal processing algorithm is used in yet another embodiment to reduce the effect of reflections of the laser beams from other objects that will ultimately strike the laser receiver's photosensors; such reflections might otherwise cause false readings, which can reduce the accuracy or reliability of the laser receiver's readouts. For the reflection rejection algorithm, the laser light need not necessarily be modulated.

BACKGROUND OF THE INVENTION

Laser alignment systems have been used for years, and some of these systems use a rotating laser light source that periodically sweeps 360°, thereby creating a plane of laser light that can be received and detected by a laser light receiver. Other types of laser alignment systems use a transmitter that projects laser energy continuously in a reference cone, or a reference plane, of light that spreads in all directions about a 360° circle. The range of such detection units, especially when used in direct sunlight, is greatly increased by modulating the laser light source at a predetermined frequency. Such a laser light alignment system using a modulated laser light source is disclosed in U.S. Pat. No. 4,756,617.

In this '617 patent, the laser energy in the alignment field is modulated at 8 kHz, and the signals produced by photodetectors of a laser light receiver are filtered and amplified. A split-cell photodetector is used, thereby producing two input signals that each have a particular strength, depending upon the position of the split-cell photodetector as it is being impacted by the modulated laser energy. After these two input signals are run through individual band pass filters and amplifiers having automatic gain control, the ratio of their signal strengths are compared (by a "ratio comparator" circuit 111) to determine the relative position that the laser light is impacting the photodetector receiver.

Unfortunately, there is a common problem when using such laser beam detectors indoors and at short range from the laser light transmitter. In such conditions, it frequently occurs that the laser beam which travels from the transmitter reflects off various surfaces such as walls, windows, or perhaps even light-colored clothing. When this occurs, the laser light detector will respond to the reflected laser energy and perhaps produce an elevation display, even though the laser detector is not directly in the actual laser beam (i.e., the beam that has not been reflected). In a worst case, some laser beam detectors will commonly display an "on-grade" condition whenever the transmitter and laser detector are in the same room, independent of the elevation or orientation of the laser detector.

The cause for such behavior can simply be a matter of sensitivity. Since such laser transmitter and detector systems are designed to operate at relatively large distances, e.g., up to one thousand feet between the transmitter and detector, and since the laser power impinging on the photocells of the detector decreases inversely proportional to this separation distance, most laser detectors are designed with extremely high sensitivity. As a result, when operated with the detector in close proximity to the transmitter, very small amounts of reflected laser power are enough to trigger the laser detector, and often will produce an erroneous elevation signal.

In the past, this problem has been addressed using a variety of methods. One method is simply to reduce the sensitivity of the laser detector. While this reduces the problem of reflected signals, it of course also reduces the operating range of the system, which is typically an undesirable trait.

A second solution for the laser light reflecting problem is to selectively reduce the sensitivity of the laser detector. This can be achieved by having a user control on the laser detector that reduces the sensitivity of the detector unit when operating in close proximity to a laser transmitter. This technique has been used in a "Pocket Level" model laser detector that was produced by Spectra-Physics, and has been described in the following patents: U.S. Pat. No. 4,756,617, U.S. Pat. No. 4,732,471, and U.S. Pat. No. 4,674,870.

A third method of combating the reflection problem is by utilizing a directional film, which is a plastic material that incorporates embedded "microlouvers" to control the optical transmission of the material, based on the incident angle of the incoming light. Such material is produced by 3M Corporation as VIKUITI LIGHT CONTROL FILM™, and is described in the following patents: U.S. Pat. No. 4,764,410, U.S. Pat. No. 4,766,023, and U.S. Pat. No. 5,254,388. The purpose of the film is to limit the angle of light entering the laser detector to only that which is substantially normal to the front surface of the detector unit. In this way, stray laser power from reflections in a small room will largely be rejected and ignored by the laser detector, while the intended direct laser power will be passed through the film and thus detected. Since the "light control" film operates in one axis only, to achieve rejection of straight laser power in both horizontal and vertical axes, then two layers of material must be used having microlouvers arranged on a first layer in the horizontal direction, and the second layer on the vertical direction or axis. This is the method used in the HR200 model laser detector produced by Trimble Navigation, Ltd.

Problems with the above "solutions:" in the second solution described above, user intervention is required. If a user does not realize that the laser transmitter-detector system is in an error-prone situation, or if the user is poorly trained or just forgets, then the user may not activate the short range mode of the detector. In that situation, the user will encounter erroneous elevation indications with no clear method of realizing that this is the case. Similarly, if the short range mode is enabled, and then the range between the transmitter and laser detector increases, then suddenly the system operating range will not be as expected, and the user may not realize that the "short range mode" now having been enabled has become the problem.

With regard to the third solution described above, it should be realized that the "light control film" is comparatively expensive, and moreover, this solution is not complete. If reflections nevertheless occur in a way such that the incident angle of light into the laser detector is mostly normal, then the laser detector unit can still indicate an erroneous elevation data with no indication that there has been a problem due to the reflections. Furthermore, by design the "light control film" limits the acceptance angle of the laser detector. The acceptance angle is the angle at which the detector can be rotated so that it no longer faces the transmitter and will still properly operate. In practice, it is desired that the acceptance angle be as large as possible for ease of operation for the customer/user. This is in direct conflict with the intended operation of the "light control film" and thus use of the film is a detriment for the customer/user.

It would be desirable to provide yet another solution for rejecting reflections of modulated laser light when used with such laser light receivers/detectors. One new way of achieving this is to use a software algorithm that senses a "pattern" of the laser light being received by the photoelements of the detector.

SUMMARY OF THE INVENTION

Accordingly, it is an advantage of the present invention to provide a modulated laser light detector that can reliably measure the peak magnitudes of received laser light signals at their respective photocells, and thereby reliably indicate the correct grade or elevation where the laser signal impacts the receiver photocell elements.

It is another advantage of the present invention to provide a modulated laser light receiver that can detect the relative magnitudes or strengths of laser light impacting at least two photocell elements of the receiver unit, while using a mixer and a filter circuit to improve the signal-to-noise characteristics, and thereby more accurately detect the peak values of the modulated laser light signals impacting the photocells at greater distances.

It is a further advantage of the present invention to provide a modulated laser light detector that uses a phase locked loop and a synchronous rectifier to improve the low noise characteristics, and thereby more accurately measure the relative strengths of the incoming signals from the photocells at greater distances.

It is yet another advantage of the present invention to provide a modulated laser light detector that uses alternative detection circuitry to reduce the cost of the system, while still utilizing an improved signal-to-noise ratio by use of a superheterodyne receiver, or by using other similar elements such as a mixer and a low pass filter.

It is still another advantage of the present invention to provide a modulated laser light detector that uses a software algorithm to help reduce the cost of the system, in which a "software phase locked loop" is used instead of a hardware phase locked loop, as part of the process used for determining the beam position of the laser light striking the array of photodetector elements of the receiver.

It is yet a further advantage of the present invention to provide a modulated laser light detector that uses a software algorithm to help reduce the cost of the system, in which a software algorithm that determines the root mean square value of multiple instantaneous samples of the received laser light signals at the IF frequencies is used as part of the process used for determining the beam position of the laser light striking the array of photodetector elements of the receiver.

It is still a further advantage of the present invention to provide a modulated laser light detector that uses a software algorithm to help reduce the cost of the system, in which a software algorithm that determines a Discrete Fourier Transform value of multiple instantaneous samples of the received laser light signals at the IF frequencies is used as part of the process used for determining the beam position of the laser light striking the array of photodetector elements of the receiver.

It is yet another advantage of the present invention to provide a laser light detector that uses a signal processing software algorithm to reduce or eliminate the effect of reflections of the laser beam from other objects, in which those reflections may strike the photosensors of the laser light detector, and the reflection rejection algorithm increases the accuracy and reliability of the position readout of this improved laser light detector.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) a mixer circuit that receives the at least one second signal, and receives a third signal having a predetermined, substantially fixed frequency; and which outputs a mixed at least one fourth signal which has a lower frequency component and a higher frequency component; (d) a second filter circuit that receives the at least one fourth signal and filters out the higher frequency component of the at least one fourth signal, and thereby outputs at least one fifth signal related to the lower frequency component of the at least one fourth signal; (e) a signal conversion circuit that converts the at least one fifth signal into at least one sixth signal having a substantially DC voltage that is related to a signal strength of the at least one fifth signal; and (f) at least one signal strength detector that inspects the substantially DC voltage of the at least one sixth signal, and thereby determines a relative strength of the received modulated light energy.

In accordance with another aspect of the present invention, a modulated light detector is provided, which comprises: (a)

at least one light photosensor, which generates at least one first electrical signal when receiving modulated light energy having at least one predetermined range of wavelengths and at least one predetermined range of modulation frequencies; (b) a superheterodyne receiver circuit that receives the at least one first electrical signal and outputs at least one second signal having a frequency within a second, different predetermined range; (c) a signal conversion circuit that converts the at least one second signal into at least one third signal having a substantially DC voltage that is related to a signal strength of the at least one second signal; and (d) at least one signal strength detector that inspects the substantially DC voltage of the at least one third electrical signal, and thereby determines a relative strength of the received modulated light energy.

In accordance with yet another aspect of the present invention, a method for detecting a modulated light beam is provided, in which the method steps comprise: (a) receiving an electromagnetic laser signal having at least one predetermined range of wavelengths and at least one predetermined first range of modulation frequencies, and converting the electromagnetic laser signal into a first electrical signal; (b) converting the first electrical signal from the at least one predetermined first range of modulation frequencies to a second signal having at least one predetermined second, different range of frequencies that is related to the at least one predetermined first range of modulation frequencies; and (c) detecting a signal strength of the second signal, and thereby determining a relative strength of the received modulated electromagnetic signal.

In accordance with a further aspect of the present invention, a method for detecting a modulated light beam is provided, in which the method steps comprise: (a) receiving an electromagnetic laser signal having at least one predetermined range of wavelengths and at least one predetermined first modulation frequency, and converting the electromagnetic laser signal into a first electrical signal; (b) converting the first electrical signal from the at least one predetermined first modulation frequency to a second signal having at least one predetermined second, different frequency that is related to the at least one predetermined first modulation frequency; and (c) sampling, over a sampling time interval, the second signal at a rate that is an integer multiple of the at least one second frequency, and determining a substantially instantaneous magnitude of the sampled second signal, thereby deriving a value A that represents the substantially instantaneous magnitude of the sampled second signal; (d) squaring A, and summing the value A2 for each the sampled second signal over at least one complete period of the second frequency, thereby deriving a value B; (e) dividing B by the number of samples taken of signal A, thereby deriving a value C; (f) taking the square root of C, thereby deriving a value D; and (g) using the value D to substantially represent a steady state signal magnitude that is used as a representation of a signal strength of the second signal over the sampling time interval, and thereby determining a relative strength of the received modulated electromagnetic signal.

In accordance with yet a further aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) an intermediate frequency stage that (i) mixes the at least one second signal with a predetermined third signal to create a mixed signal, (ii) filters the mixed signal, and (iii) outputs at least one fourth signal, which has a substantially predetermined lower frequency component of the mixed signal; and (d) a processing circuit that is configured to: (i) receive the at least one fourth signal and sample it at a rate that is an integer multiple of the frequency of the substantially predetermined lower frequency component of the mixed signal; (ii) determine a substantially instantaneous magnitude of the sampled at least one fourth signal, thereby deriving a value A that represents the substantially instantaneous magnitude of the sampled at least one fourth signal; (iii) square a value of A, and sum the value A2 for each the sampled at least one fourth signal over at least one complete period of the predetermined lower frequency component of the mixed signal, thereby deriving a value B; (iv) divide a value of B by the number of samples taken of signal A, thereby deriving a value C; (v) take the square root of a value of C, thereby deriving a value D; and (vi) use the value of D to represent a substantially steady state signal magnitude that is used as a representation of a signal strength of the at least one fourth signal, and thereby determine a relative strength of the received modulated light energy.

In accordance with still a further aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a superheterodyne receiver circuit that receives the at least one first electrical signal and outputs at least one second signal having a frequency within a second, different predetermined range; (c) a sampling circuit that, over a sampling time interval, samples the at least one second signal at a rate that is an integer multiple of the at least one second predetermined frequency range, thereby determining a substantially instantaneous magnitude of the sampled second signal for a plurality of samples; and (d) a signal conversion circuit that determines a root mean square value of the plurality of samples of the sampled second signal, thereby determining a substantially steady state magnitude that is related to a signal strength of the at least one second signal, and thus determining a relative strength of the received modulated light energy.

In accordance with still another aspect of the present invention, a method for detecting a modulated light beam is provided, in which the method steps comprise: (a) receiving an electromagnetic laser signal having at least one predetermined range of wavelengths and at least one predetermined first modulation frequency, and converting the electromagnetic laser signal into a first electrical signal; (b) converting the first electrical signal from the at least one predetermined first modulation frequency to a second signal having at least one predetermined second, different frequency that is related to the at least one predetermined first modulation frequency; (c) sampling, over a sampling time interval, the second signal at a rate that is an integer multiple of the at least one second frequency, and determining a substantially instantaneous magnitude of the sampled second signal, thereby deriving multiple values A that each represent the substantially instantaneous magnitude of the sampled second signal; (d) determining a Discrete Fourier Transform (DFT) value for each the sampled second signal A over at least one complete period of the second frequency, thereby deriving multiple DFT values B; (e) after all samples are taken for a predetermined sample period, determining real and imaginary components of the multiple DFT values B, thereby deriving multiple values C;

(f) determining a magnitude of a spectral component of the multiple values C, thereby deriving multiple values D; and (g) using one of the values D to substantially represent a steady state signal magnitude that is used as a representation of a signal strength of the second signal over the sampling time interval, and thereby determining a relative strength of the received modulated electromagnetic signal.

In accordance with yet another aspect of the present invention, a modulated light detector is provided, which comprises: (a) at least one light photosensor, which generates at least one first electrical signal when receiving modulated light energy having at least one predetermined range of wavelengths and at least one predetermined range of modulation frequencies; (b) a first filter circuit having a predetermined frequency characteristic, which receives the at least one first electrical signal and outputs a filtered at least one second signal; (c) an intermediate frequency stage that (i) mixes the at least one second signal with a predetermined third signal to create a mixed signal, (ii) filters the mixed signal, and (iii) outputs at least one fourth signal, which has a substantially predetermined lower frequency component of the mixed signal; and (d) a processing circuit that is configured to: (i) receive the at least one fourth signal and sample it at a rate that is an integer multiple of the frequency of the substantially predetermined lower frequency component of the mixed signal; (ii) determine a substantially instantaneous magnitude of the sampled at least one fourth signal, thereby deriving multiple values A that each represent the substantially instantaneous magnitude of the sampled at least one fourth signal; (iii) determine a Discrete Fourier Transform (DFT) value for each the sampled second signal A over at least one complete period of the second frequency, thereby deriving multiple DFT values B; (iv) after all samples are taken for a predetermined sample period, determine real and imaginary components of the multiple DFT values B, thereby deriving multiple values C; (v) determine a magnitude of a spectral component of the multiple values C, thereby deriving multiple values D; and (vi) use one of the values D to represent a substantially steady state signal magnitude that is used as a representation of a signal strength of the at least one fourth signal, and thereby determine a relative strength of the received modulated light energy.

In accordance with a further aspect of the present invention, a method for detecting a laser light beam is provided, which comprises: (a) receiving a laser light signal, and converting said laser light signal into a plurality of electrical signals by use of a plurality of photosensors; (b) determining a signal strength of each of said plurality of electrical signals; (c) determining an active sensing area of each of said plurality of photosensors; and (d) analyzing said signal strengths and said active sensing areas, and from that information, determining whether said received laser light signal substantially comprised reflected light.

In accordance with yet a further aspect of the present invention, a method for detecting a laser light beam is provided, which comprises: (a) receiving a laser light signal, and converting said laser light signal into a plurality of electrical signals by use of a plurality of photosensors; (b) combining said plurality of electrical signals into a Channel A signal and a Channel B signal, and determining signal strengths of both Channel A and Channel B signals; (c) determining at least one active sensing area of said plurality of photosensors that corresponds to generating the Channel A and Channel B signals; (d) calculating an area ratio R1 and an area ratio R2, based upon said active sensing areas of said plurality of photosensors; (e) calculating a signal ratio S1 and a signal ratio S2, based upon said signal strengths of said Channel A and Channel B signals; and (f) determining whether said ratios S1 and S2 are within a rejection tolerance of said ratios R1 and R2, and: (i) if not, updating a display to show a position where said laser light signal impacted said plurality of photosensors, for a last sample taken of the received laser light; and (ii) if so, rejecting the last sample taken of the received laser light, and not updating said display.

In accordance with still a further aspect of the present invention, a laser light detector is provided, which comprises: (a) a plurality of laser light photosensors, which generate a plurality of electrical signals when receiving laser light energy, said plurality of laser light photosensors each having an active sensing area; and (b) a processing circuit that receives said plurality of electrical signals, said processing circuit being configured to: (i) determine a signal strength of each of said plurality of electrical signals; (ii) determine a physical size of said active sensing areas of said plurality of laser light photosensors; and (iii) based on that information, determine whether said laser light energy substantially comprises reflected light.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 3 is a diagrammatic view of another alternative type of photodiode array, having two large cells and two middle small cells, usable with the present invention.

FIG. 4 is a diagrammatic view of yet another alternative photodiode array, having two large cells and one middle small cell, usable with the present invention.

FIG. 5 is a diagrammatic view of a set of two photocells, in which there are two large cells with no intermediate smaller cell, usable with the present invention.

FIG. 28 is a diagrammatic view of a photocell used in a laser receiver constructed according to the principles of the present invention, in which there are five active regions or areas of the photocell, that can be switchably electrically connected, and exhibit a comparatively wide deadband.

FIG. 29 is a diagrammatic view of a photocell used in a laser receiver constructed according to the principles of the present invention, in which there are five active regions or areas of the photocell, that can be switchably electrically connected, and exhibit a comparatively narrow deadband.

FIG. 30 is a diagrammatic view of a photocell used in a laser receiver constructed according to the principles of the present invention, in which there are three active areas or regions of the photocell, and in which these are "hard-wired" areas that also define the deadband of the photocell subassembly.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
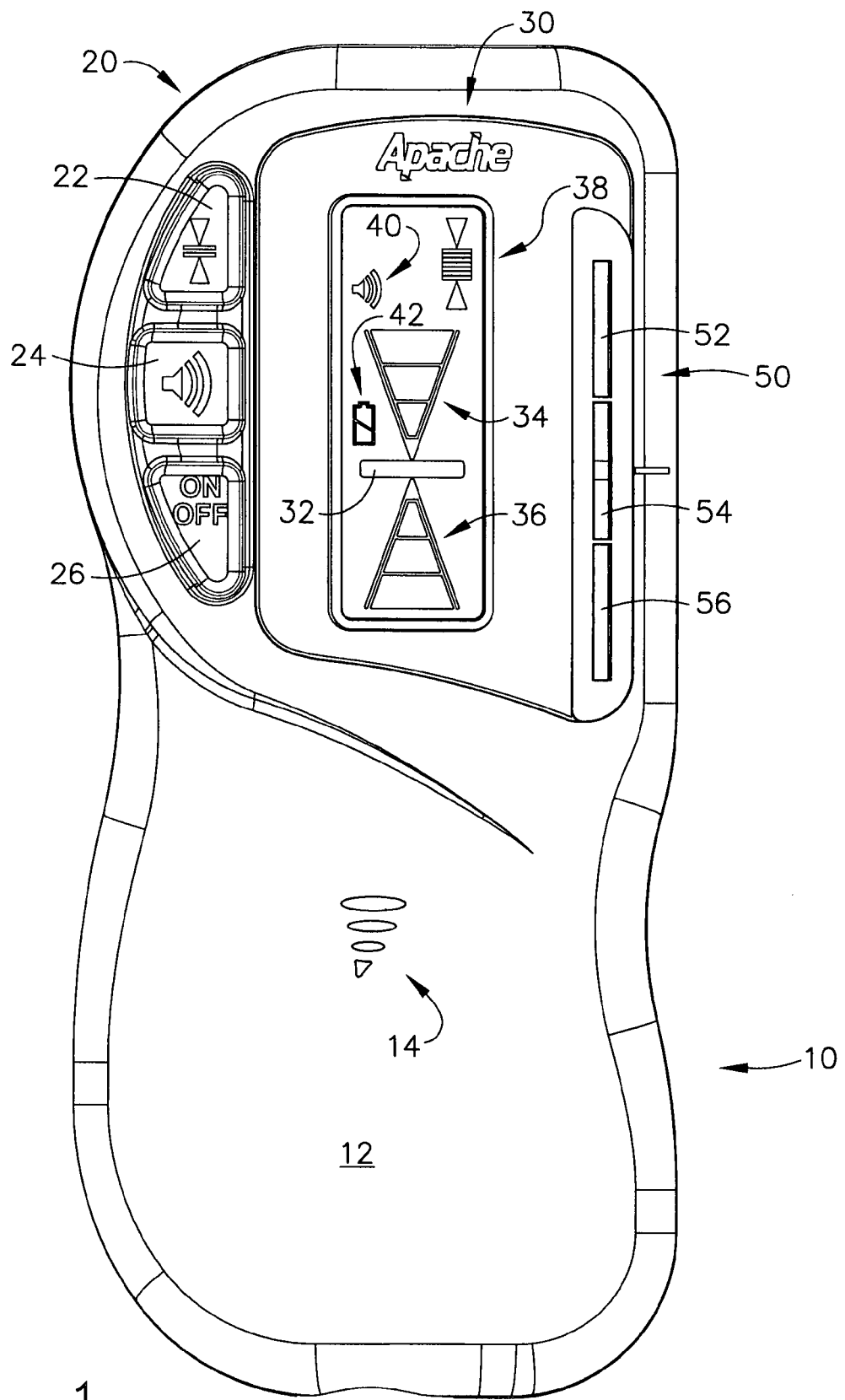
FIG. 1 is a front elevational view of a hand-held modulated laser light detector, as constructed according to the principles of the present invention.

Referring now to FIG. 1, a modulated laser beam detector unit is illustrated, generally designated by the reference numeral 10. Its front outer surface at 12 is typically a plastic molded housing, which has some openings at 14 to allow for an internal beeper or other type of audio output device to be used. A set of pushbutton switches generally designated by the reference numeral 20 are located along the upper left-hand side of the case. These switches are designated by the reference numerals 22, 24, and 26, in which the top switch 22 may act as a dead band control switch on some models of laser receivers sold by Apache Technologies, Inc., the middle switch 24 enables the beeper (or other type of audio output device) to be activated, and the bottom switch 26 is the unit's ON-OFF switch.

The modulated laser beam detector 10 also includes a liquid crystal display, generally designated by the reference numeral 30. On this LCD display 30 there are several symbols that provide information to the user. The "grade" symbols are designated at the reference numerals 32, 34, and 36, in which the middle symbol 32 would be energized when the laser beam detector 10 is positioned "ON-GRADE" with respect to the plane of light being emitted by a modulated laser light source (not shown). The LCD "arrowhead" triangular-shaped indicators 34 and 36 are, respectively, indicators of above-grade and below-grade. In the illustrated embodiment of the laser detector 10, there are three different above-grade indicators and three different below-grade indicators, thereby providing the user with an indication as to how close or how far the detector 10 is from being on-grade.

A battery symbol at 42 is illustrated on the LCD display 30, which will be visible when the battery that powers the unit 10 has been depleted past a predetermined point. The "speaker" symbol 40 is also part of the LCD display 30, which is visible when the beeper (or speaker) has been enabled (by pushing the button 24). On some models, the symbol at 38 on the LCD 30 provides an indication as to the width for the dead band setting.

On FIG. 1, the modulated laser beam detector 10 includes a set of photodetectors, generally designated by the reference numeral 50. In an exemplary embodiment, these photodetectors comprise multiple photocells, such as photodiodes, and they are arranged in a vertical line (as seen in FIG. 1), in which the upper photodiode is at 52, the bottom photodiode is at 56, and the middle photodiode is at 54. The photodiodes in this array are used to intercept the plane of laser light being emitted by the laser light source (not shown), and these photodiodes can output an electrical current, and they are used in the electronic control circuit of the receiving device 10 in a manner that is described in a schematic diagram that starts on FIG. 6. As can be seen in FIG. 1, the middle photodiode 54 is actually comprised of six different photocell sections, each of which represents a separate electrical component, and which are also illustrated on the schematic diagram of FIG. 6.

In this patent document, the terms "photocell" and "photodiode" both refer to an optoelectronic device that produces some form of an electric signal when optical energy impacts such optoelectronic device. A photodiode is a type of photocell, which is a more generic term. The type of electrical signal produced by a photocell need not necessarily be independently sourced to the photocell itself. For example, if a photocell merely changes electrical resistance, then it would not by itself produce an electrical signal. However, if a bias current or a bias voltage is applied to such a resistance-sensitive photocell, then it truly would become an optoelectronic device of the type that could be used in the present invention.

It will be understood that the photodetectors 50 do not necessarily need to consist of photodiodes. Other types of photosensitive components could be used, including phototransistors and photovoltaic cells, which can be considered equivalents to photodiodes for use in the present invention. Essentially any type of optoelectronic component could be used in the present invention, so long as it is "sensitive" to electromagnetic radiation (i.e., such that it will vary its resistance, its current output, or its voltage output as it receives a varying quantity of photons). Such optoelectronic devices do not necessarily have to exhibit a linear response to the received electromagnetic radiation, although such a linear response is generally helpful when determining the strength of the optical energy (i.e., electromagnetic radiation) being received. It will also be understood that the photodetectors 50 do not necessarily have to be particularly sensitive to collimated light in situations where the present invention may be used to detect non-laser light sources. However, for most commercial applications of the present invention, a laser light source is generally preferred, and the photodetectors 50 would typically be designed to be sensitive to such laser energy.

Figure 2:
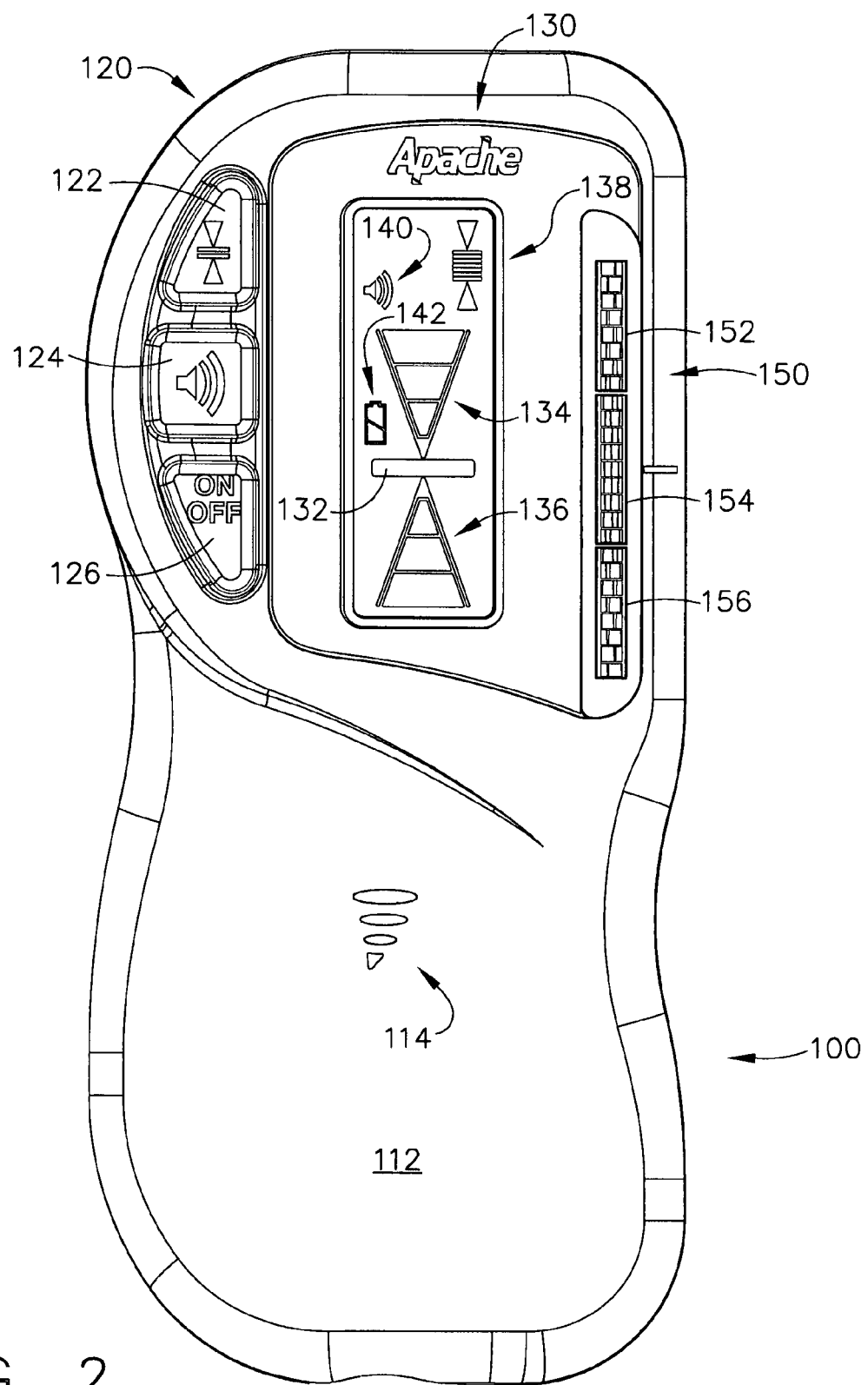
FIG. 2 is another front view of an alternative embodiment for a hand-held modulated laser beam detector, in which an alternative photodiode array is constructed of a number of individual photocell segments.

Referring now to FIG. 2, an alternative embodiment for a modulated laser beam detector is illustrated, generally designated by the reference numeral 100. This photodetector includes a front outer case at 112, and a set of holes for a speaker or beeper at 114. There is also an array of pushbuttons at 120, a liquid crystal display at 130, and an array of photodetectors at 150. The pushbutton switches 122, 124, and 126 have essentially the same functions as the similar switches 22, 24, and 26 that were found on the device 10 illustrated in FIG. 1. The LCD display 130 also has similar capabilities and symbols, including the grade symbols 132, 134, and 136, the low battery symbol 142, the speaker enabled symbol 140, and the dead band status symbol 138.

The main difference between this second embodiment 100 and the first embodiment 10 is the actual photodiode array 150. As can be seen by inspecting FIG. 2, there are again three major photodiode sections at 152, 154, and 156. However, each of these individual photodiode sections is broken into many small photocell segments, which provides for a more accurate laser receiver that can reduce shading effects of the photocells. The principles of this type of photocell design are disclosed in detail in U.S. Pat. No. 6,133,991, titled MULTI-SEGMENT COMPOSITE PHOTOCELL DEVICE, which is commonly assigned to Apache Technologies, Inc. of Dayton, Ohio.

The different types of photocell arrangements of the embodiments 10 and 100 are merely possible examples for use with the electronics of the present invention. Other example photocell array patterns are disclosed on FIGS. 3, 4, and 5. Referring now to FIG. 3, a four-segment photocell array is illustrated, generally designated by the reference numeral 160. The top photocell is 162, the bottom photocell is 168, and there are two "middle" photocells 164 and 166. This type of photocell configuration has been disclosed in U.S. Pat. No. 5,486,690, titled METHOD AND APPARATUS FOR DETECTING LASER LIGHT, which is commonly assigned to Apache Technologies, Inc. of Dayton, Ohio. Further possible photodetectors that could be used with the present invention are described in published patent applications, No. US 2003/0058446 A1, No. US 2003/0202172 A1, and No. US 2003/0174305 A1.

Referring now to FIG. 4, a three-segment photocell array is generally designated by the reference numeral 170, which has a top photocell 172, a bottom photocell 176, and a smaller middle photocell 174. As another example of the flexibility of the present invention, the photocell array 180 of FIG. 5 only includes two fairly large photocell segments, at 182 and 184. In this design, there are no smaller "mid-cells."

Figure 6:
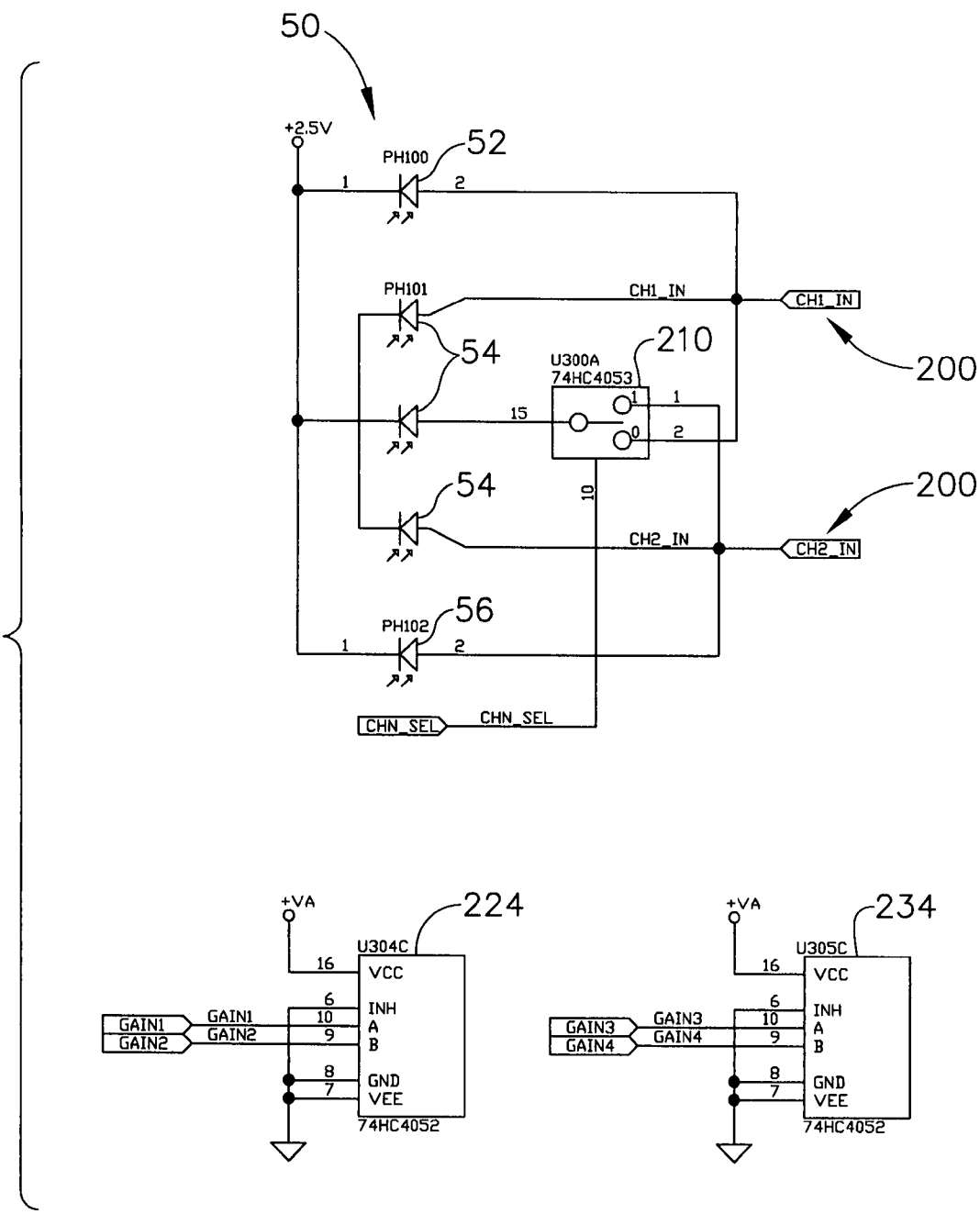
FIGS. 6-18 are an electrical schematic diagram of a portion of the electrical circuit used in the modulated beam detector of FIG. 1.

FIGS. 6-17 illustrate a rather complex electrical schematic diagram, starting on FIG. 6. The input photocells are illustrated along the left-hand side of FIG. 6, and these photocells (e.g., photodiodes) as a single array are generally designated by the reference numeral 50. On FIG. 6, there are two "outer" photocells at 52 and 56, and also a set of three individual photocells that act as the "middle" photocell 54, as seen on FIG. 1. The output of one of the three "middle" photocells 54 is switched by an analog multiplexer (or analog switch) 210 to create two channels of input signals 200. The analog multiplexer 210 is controlled by a channel select signal that is output by a microprocessor unit 280 (see FIG. 12), which periodically changes the state of the multiplexer internal "switch contact," so that the photocell input signals can be properly apportioned to a "channel 1" signal and a "channel 2" signal, which in turn provides an indication as to the position, or level, that the laser light is striking the photocell array 50.

Figure 7:
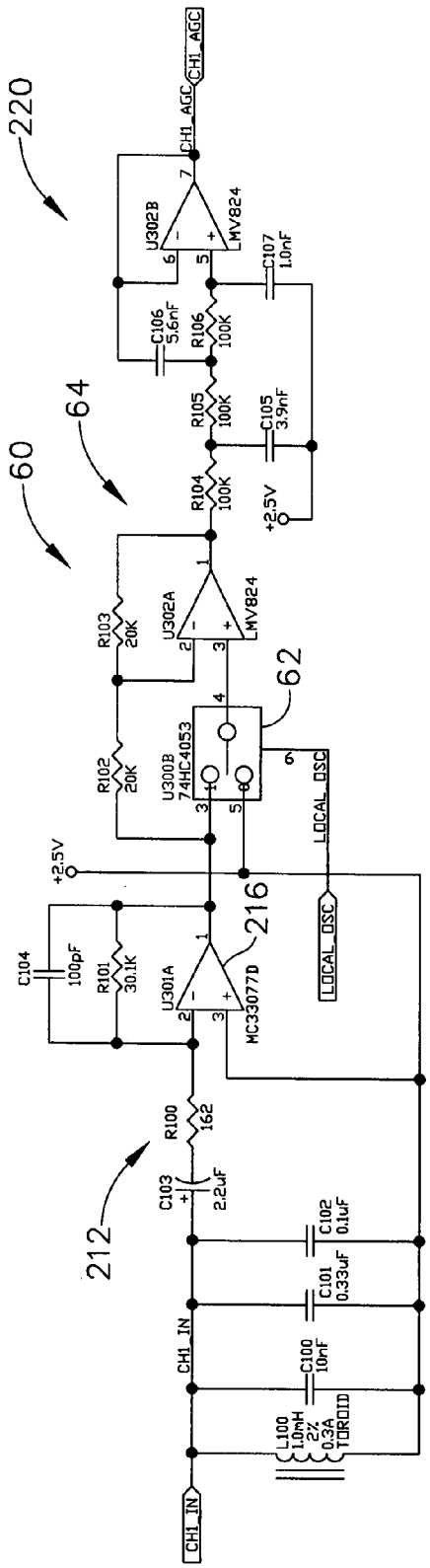
Figure 8:
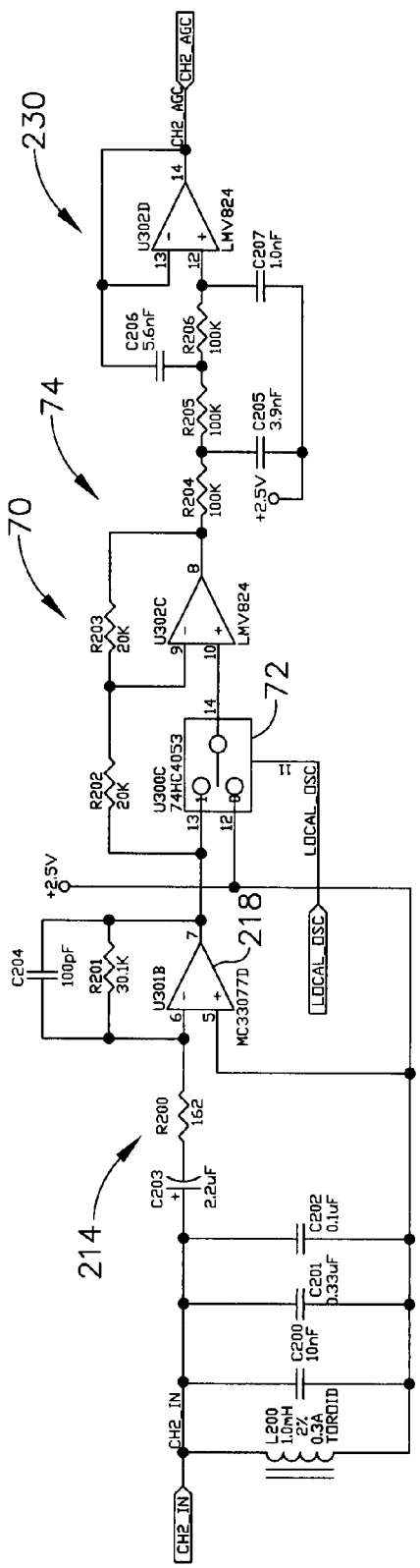

The electrical signals that are output from the analog switches are split into channel 1 and channel 2 signals, as noted above, and these are then directed to two band pass filters 212 and 214, respectively, illustrated on FIGS. 7 and 8. The outputs of these band pass filters 212 and 214 are directed to a set of low noise amplifiers at 216 and 218, respectively, which also are depicted on FIGS. 7 and 8. The output signals from the low noise amplifiers 216 and 218 of the illustrated embodiment typically have an output (or transfer) impedance of about 26.7 kOhms, and a maximum output voltage amplitude of about 420 mV peak to peak, under conditions where laser light is striking the photodiode array 50.

The bandpass filters 212 and 214 typically would be tuned to a predetermined frequency, such as 8.2 kHz. For other types of laser receiver applications, the tuned bandpass filters might be set to a different frequency, such as 7.8 kHz. For the purposes of describing the present invention, it will be assumed that the bandpass filter center frequency is 8.2 kHz, which will be used in conjunction with other portions of the circuit to be described below. In general, the center frequency of the bandpass filters would correspond to the modulation frequency of the laser light being received at the photocells.

The output signals from the low noise amplifiers 216 and 218 are respectively directed to two mixers 60 and 70, which are depicted on FIGS. 7 and 8. These mixers 60 and 70 also receive a square wave signal referred to on the drawings as "LOCAL OSC," which is a "local" oscillator signal. In the illustrated embodiment, this local oscillator signal runs at a frequency of 8.0 kHz (i.e., at a substantially fixed frequency), and is directed into another set of analog multiplexers 62 and 72 (see FIGS. 7 and 8). The output of mixers 60 and 70 are signals at 64 and 74 in the figures that have frequency components that run at both 200 Hertz and 16.2 kHz. These two signals 64 and 74 are each directed to a low pass filter 220 or 230, respectively (see FIGS. 7 and 8).

In the illustrated embodiment, each of the low pass filters 220 and 230 represents a 3-pole Bessel low pass filter having a corner frequency of 400 Hertz. This will effectively filter out the 16.2 kHz component of the output of mixers 60 and 70, thereby leaving only the 200 Hz component of those signals. This 200 Hz signal has a frequency that is substantially the absolute value of the difference in frequencies between the input signal (referred to on FIG. 7 as "CH1_IN") and the local oscillator signal (referred to as "LOCAL OSC").

Figure 9:
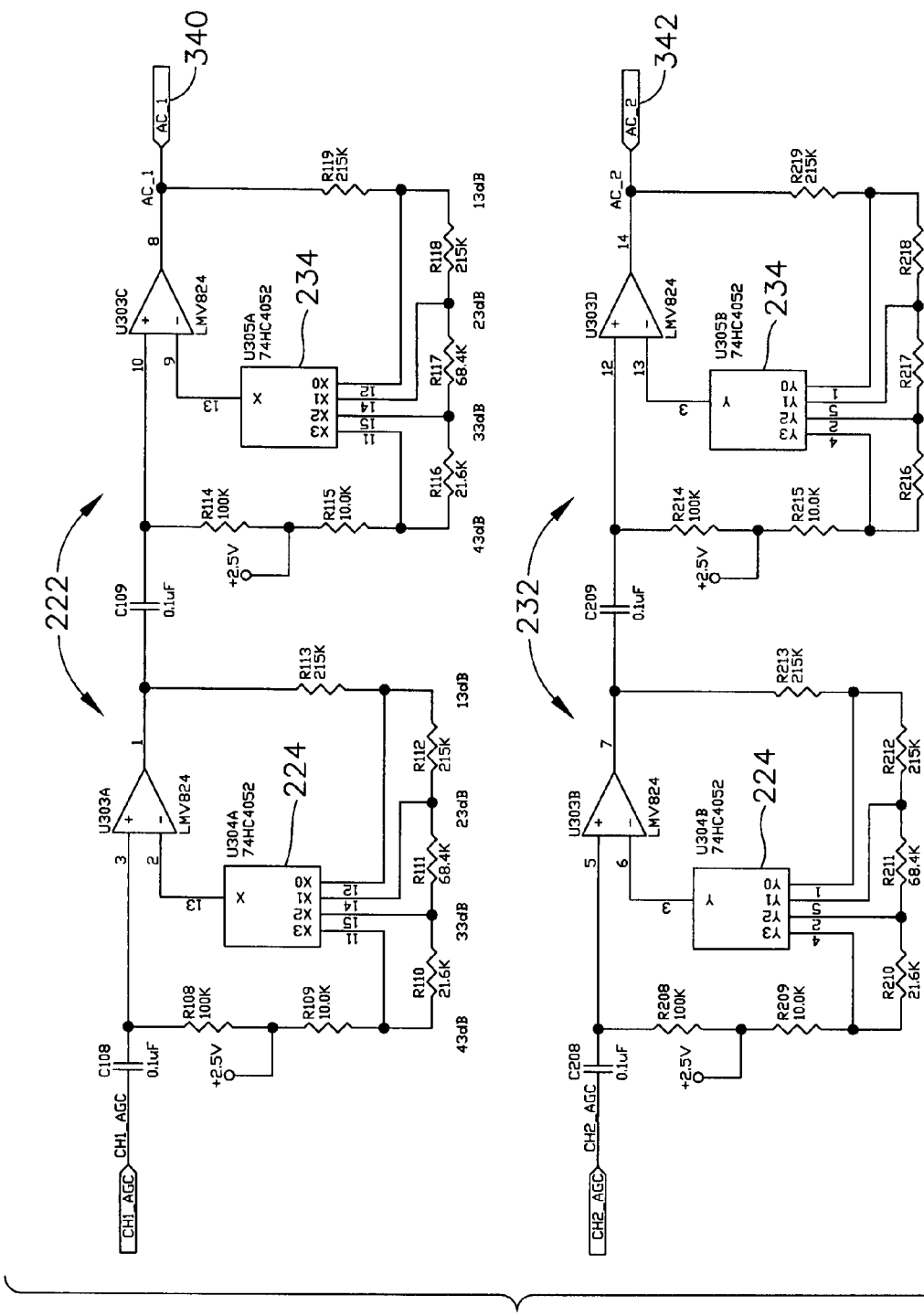

In the illustrated embodiment, the output signals from the low pass filters 220 and 230 are directed to an automatic gain control circuit, such as viewed on FIG. 9. It should be noted that the low pass filter circuits 220 and 230 essentially act as an IF (Intermediate Frequency) stage on the output side of the mixer. A typical IF stage might have a bandpass filter rather than a low pass filter, and such a configuration would also work in the present invention. The mixers 60 and 70 in combination with the filters 220 and 230 essentially act as a superheterodyne receiver, which provides a very high gain and a significant signal-to-noise ratio. It will be understood that other circuit configurations also could be used to achieve the high gain and beneficial signal-to-noise ratios in the circuits illustrated herein, without departing from the principles of the present invention.

The two filtered signals leave FIGS. 7 and 8 as signals called "CH1-AGC" and "CH2-AGC" for Channels 1 and 2, respectively, and then are directed onto FIG. 9 to a set of adjustable gain amplifiers that are controlled by the microprocessor or microcontroller of the system. As these signals arrive on FIG. 9, their minimum level would be a signal of about 1.58 mV peak-to-peak, and their maximum signal level would be about 5 mV peak-to-peak in the illustrated embodiment. A set of analog switches 224 and 234 are used to connect each of the gain amplifiers to the appropriate set of resistors in the feedback loop of these amplifiers, specifically the amplifiers for Channel 1 being designated at the reference numeral 222, while the amplifiers for Channel 2 are designated by the reference numeral 232. These analog switches 224 and 234 are controlled by signals from the microprocessor denoted as "GAIN 1," "GAIN 2," "GAIN 3," and "GAIN 4." The circuit controlling the logic/control inputs of analog switches 224 and 234 is depicted on FIG. 6.

In the illustrated embodiment, each of the gain amplifiers has an adjustable gain, depending on the settings of the analog switches, of 13 dB, 23 dB, 33 dB, or 43 dB. Thus the maximum gain of two in-series amplifiers is 86 dB, which is a gain of 19,881. The amplifiers of the illustrated embodiment have a gain bandwidth of about 1.1 MHz. Of course, other amplification factors could be used, and other circuitry for constructing automatic gain controllers could be used, all without departing from the principles of the present invention.

Figure 11:
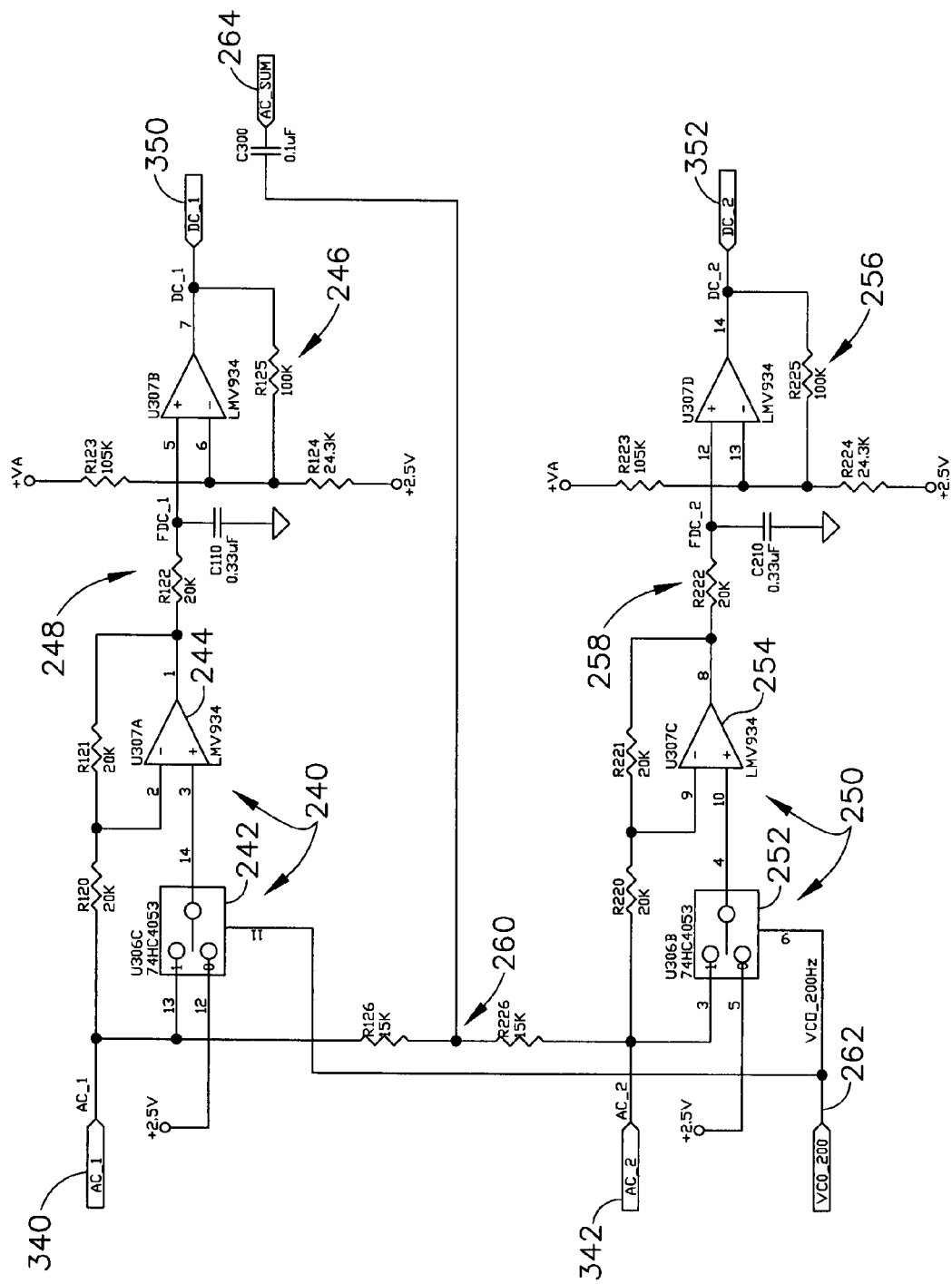

The two signal channels are now referred to as "AC1" and "AC2" and are also designated by the reference numerals 340 and 342, respectively. These signals now leave FIG. 9, and are directed to FIG. 11. Referring now to FIG. 11, the two signals 340 (AC1) and 342 (AC2) are directed into a pair of synchronous rectifiers 240 and 250, respectively. For the channel 1 rectifier 240, there is a two-input analog multiplexer at 242, which sends its output signal to a gain amplifier 244. The multiplexer 242 is controlled by a signal "VCO-200 HZ" along a signal pathway 262, which controls which of the two inputs will be sent through to the output of the multiplexer 242 and into the positive input of the operational amplifier 244. The output signal of the op-amp 244 is then directed into another low pass filter 248 with a gain amplifier at 246.

The VCO-200 HZ control signal 262 nominally consists of a square wave that is output from a phase locked loop, which is described below. When the VCO-200 HZ signal 262 is in its Logic 1 state, then the op-amp 244 acts as a voltage follower, thus having a designed optimal voltage gain of +1. When the VCO-200 HZ signal 262 is at its Logic 0 level, then a reference voltage level that is equal to about one-half of the power supply rail for these amplifiers is sent through the multiplexer 242 to the positive input of the op-amp 244. Since the power supply rails for the op-amp 244 are at +5 volts DC and ground in this exemplary circuit, the reference voltage is at about 2.5 volts DC, and acts as a virtual ground for this op-amp stage. In this circuit, the two resistors R309 and R313, by virtue of being substantially equal in resistance value, will make op-amp 244 into a gain amplifier having a designed optimal voltage gain of −1.

The overall effect of this circuit 240 is to act as a synchronous low noise rectifier and, by switching the state of the VCO-200 HZ signal in sync with the zero-crossings of the sinusoidal or "near-sine" wave output from the low pass filters 220 and 230, the sinusoidal wave signal 340 that is output by the automatic gain-controlled amplifier 222 is synchronously rectified so that the output signal from the op-amp 244 exhibits a half wave peak-to-peak voltage that is approximately one-half of the peak-to-peak voltage of the full sinusoidal wave that travels through the multiplexer 242 from amplifier 222. Since this sinusoidal wave is now rectified, there are twice as many positive-going one-half "sine" waves in the positive quadrant, and there will be virtually no negative quadrant "sine" wave voltages at the output of the synchronous rectifier circuit 240. The output from the op-amp 244 is directed to another low pass filter 248 with a gain amplifier circuit 246, which essentially demodulates the rectified "half-sine" wave into a DC voltage, having a magnitude that is related to the strength of the laser light energy received at the photocells. The output signal from the amplifier circuit 246 is designated as signal "DC1," also as reference numeral 350, on FIG. 11.

The similar signal 342 (AC2) for channel 2 drives into another two-input multiplexer 252 and another gain amplifier (or op-amp) 254. These are some of the major components of the second synchronous rectifier, generally designated by the reference numeral 250. The output from the op-amp 254 is directed to another low pass filter 258 with a gain amplifier circuit 256, which also essentially demodulates the rectified "half-sine" wave into a DC voltage, and exhibits a magnitude that is related to the strength of the laser light energy received at the photocells. The output signal from the amplifier circuit 256 is designated as signal "DC2," also as reference numeral 352, on FIG. 11.

The two "sine" waves that come into the synchronous rectifiers 240 and 250 are also directed to a summing circuit 260. These signals travel through a set of resistors and a capacitor, before being sent as a "summed AC" signal 264 to a phase locked loop circuit, which will be described immediately below.

Figure 10:
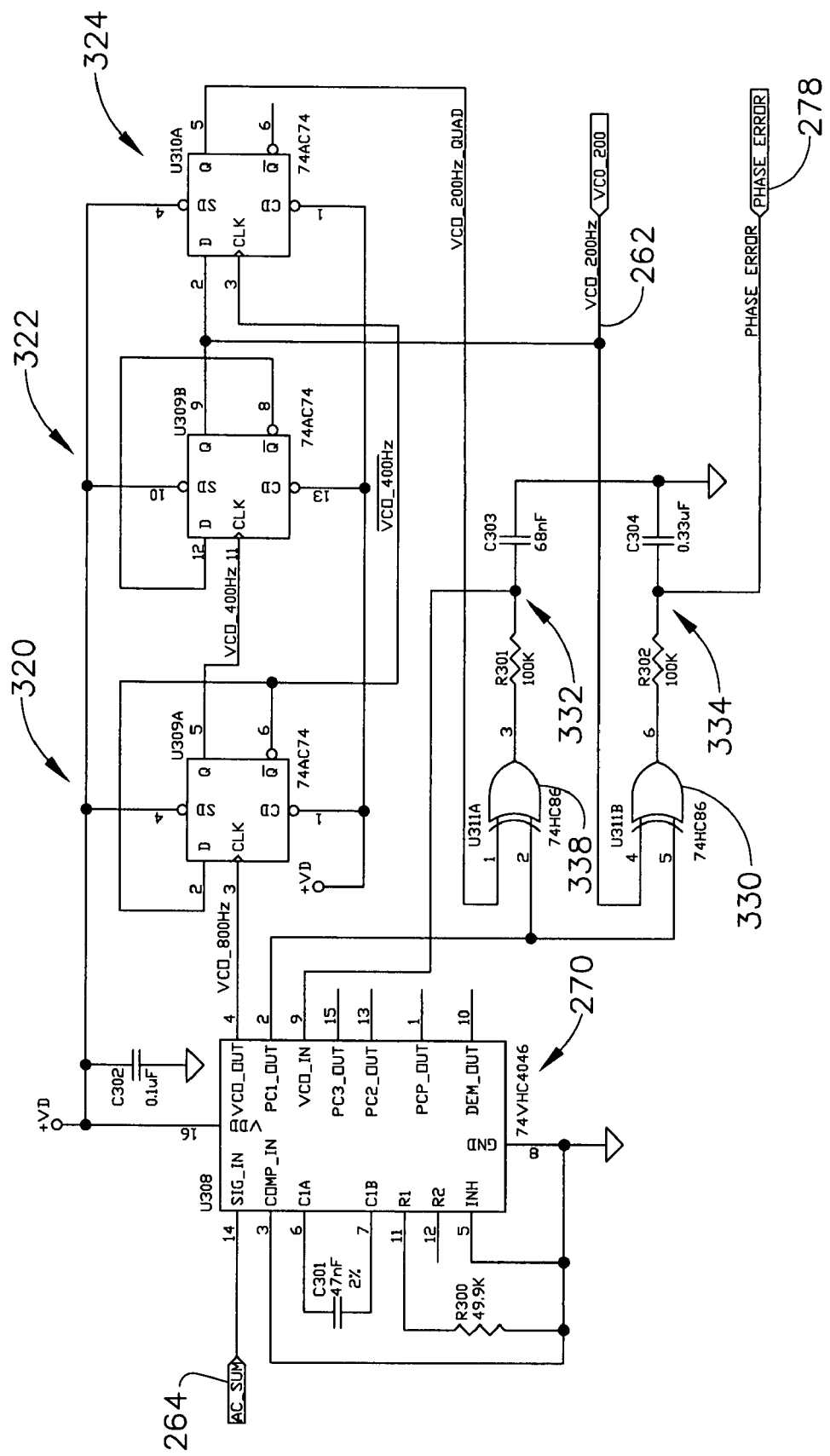

A phase locked loop circuit (PLL) and a "lock detect" circuit are illustrated on FIG. 10, and are generally designated by the reference numeral 270. The summed AC signal 264 ("AC-SUM") is used to provide information to the phase locked loop, and this AC-SUM signal 264 will provide some type of AC waveform if either one of the channels is outputting a voltage, regardless as to which exact set of photodiodes in the array 50 are being impacted by the modulated laser beam. The phase locked loop 270 is utilized to determine if the proper modulated signal is being received at the photodiode array 50, and if so, attempts to bring the overall receiver circuit of the detector 10 into a synchronous lock situation with the incoming modulated laser beam signal.

One of the outputs from the phase locked loop chip 270 is referred to as "VCO-OUT" and represents a signal that would run at about 800 Hz in a situation where the received modulated laser light signal has a frequency of approximately 8.2 kHz. The output of the mixer would typically comprise a signal at 200 Hz after it passed through the low pass filter 220. The 800 Hz VCO-OUT signal drives into a D flip-flop circuit at 320 (see FIG. 10) which acts as a divide-by-two frequency divider, and the output of that flip-flop is a signal of approximately 400 Hz (designated "VCO-400 HZ"), which drives into a second D flip-flop circuit 322. An inverted (second) signal of approximately 400 Hz is also generated by flip-flop 320 (designated "NOT VCO-400 HZ"), which drives an input of a flip-flop 324. Flip-flop 322 also acts as a divide-by-two frequency divider, and its output generates a signal designated as "VCO-200 HZ," which is also the signal 262 that drives the multiplexers 242 and 252 of the synchronous rectifiers 240 and 250, discussed above in reference to FIG. 11.

The VCO-200 HZ signal and the NOT VCO-400 HZ signal both drive into a third D flip-flop 324, which outputs another 200 Hz signal (designated "VCO-200 HZ QUAD") that is 90° out of phase with the VCO-200 HZ signal 262. The 200 Hz signals VCO-200 HZ and VCO-200 HZ QUAD comprise a quadrature set of signals. The two 200 Hz signals (i.e., VCO-200 HZ and VCO-200 HZ QUAD) drive into a pair of Exclusive-OR (XOR) gates at 330 and 338. The XOR gate 338 receives the VCO-200 HZ QUAD signal and a signal "PC1-OUT" from the phase locked loop chip 270; signal PC1-OUT is a digital signal corresponding to the AC-SUM signal 264. The XOR gate 338 acts as the phase comparator for the phase locked loop circuit, and its output signal is directed through a loop filter 332, and then back to the phase locked loop chip 270 as the VCO control signal.

The XOR gate 330 receives the VCO-200 HZ signal and the PC1-OUT signal as inputs. Its output signal is directed through a low pass filter circuit 334, and becomes a "phase error" signal 278 that is directed to the system controller circuit, and is used by the microprocessor (or microcontroller) to determine whether or not the phase locked loop is currently in a locked state.

Figure 12:
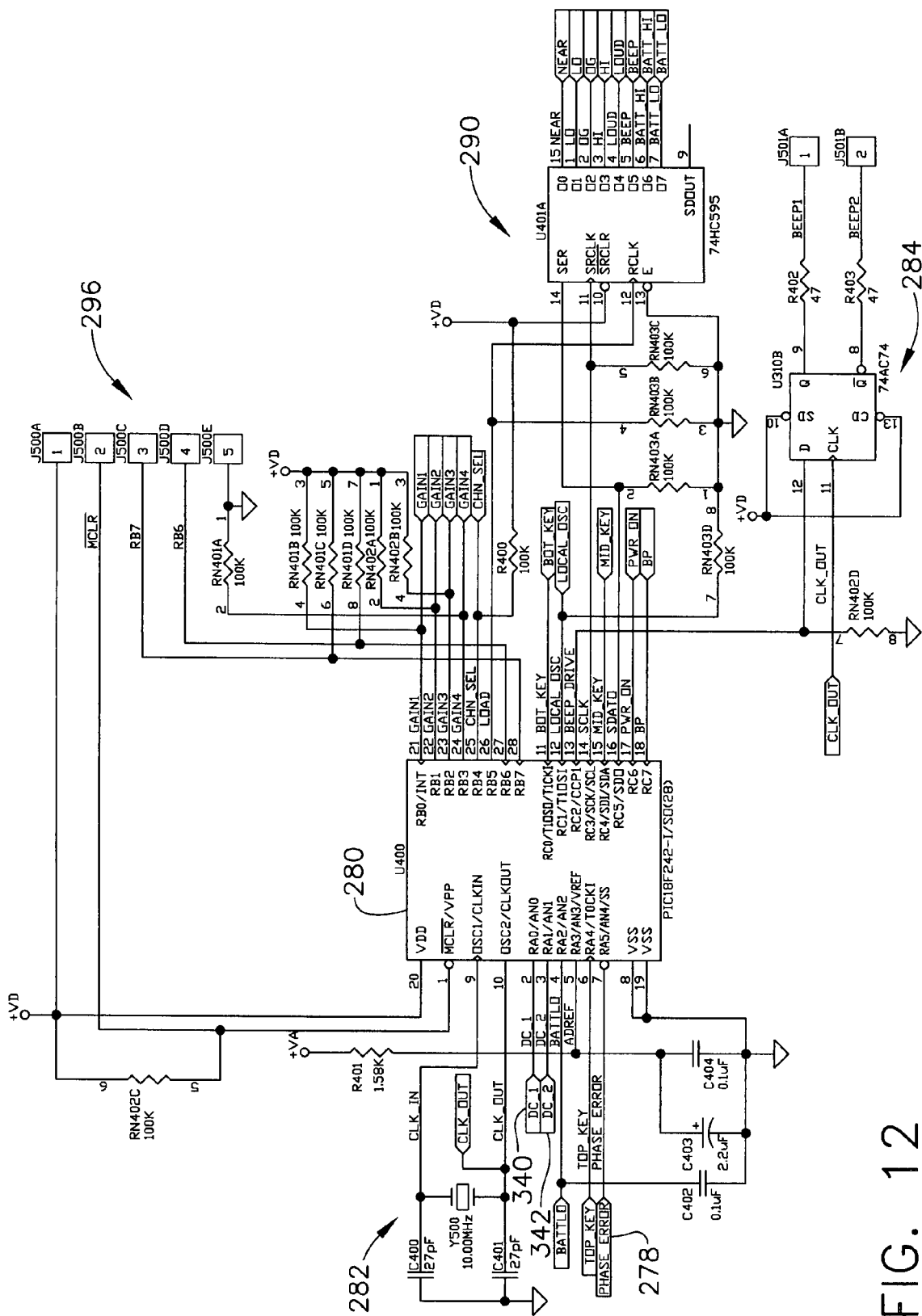
Figure 14:
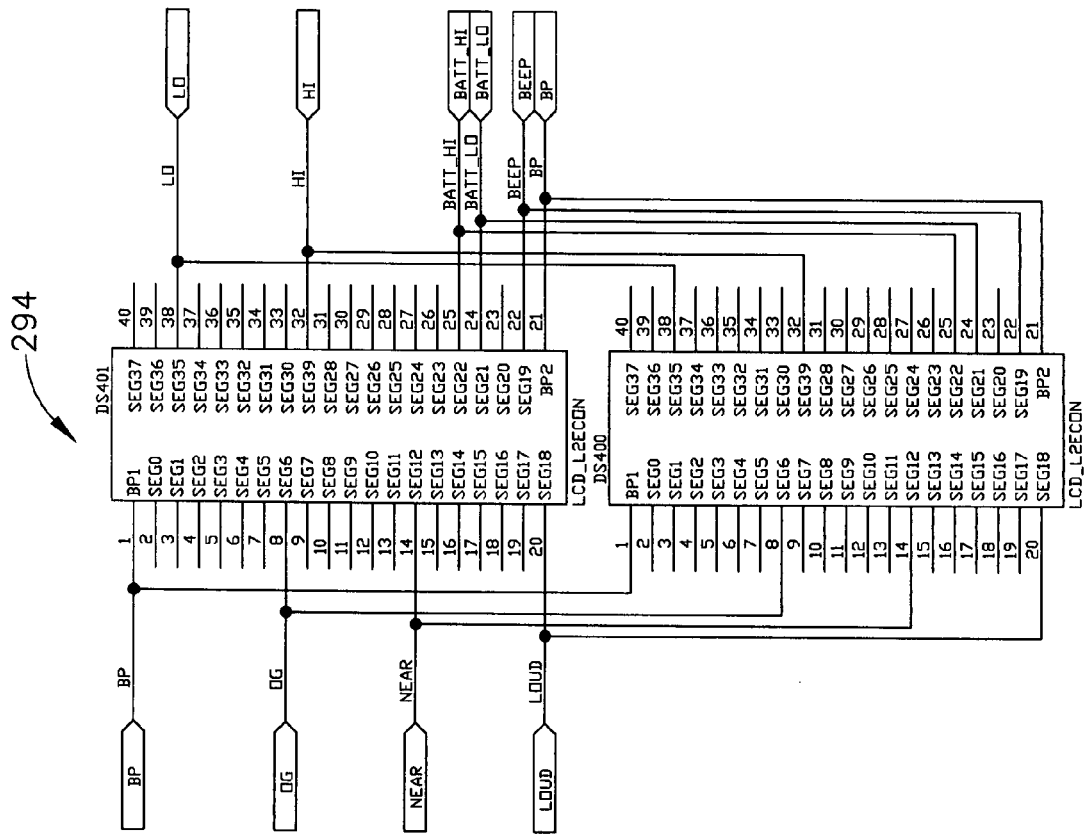
Figure 13:
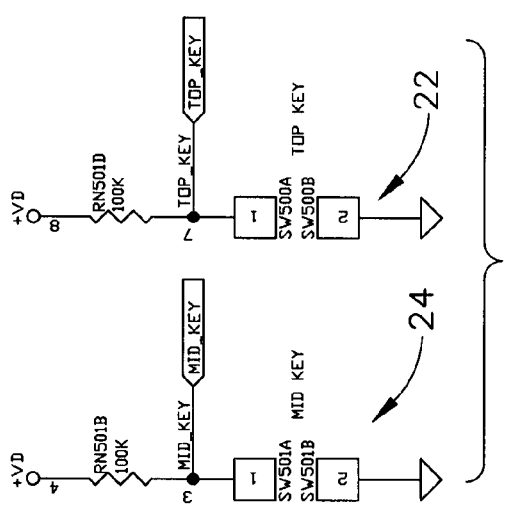

Referring now to FIG. 12, a microprocessor or microcontroller chip 280 is used to not only control the LCD display 30, but also receives many of the control and waveform signals that run throughout the electronic circuit of the detector 10. For example, the output signals 350 and 352 from the synchronous rectifiers 240 and 250 are referred to as "DC1" and "DC2" for the two channels. These signals can be directly fed to the microcontroller 280, which has an on-board analog-to-digital (A/D) converter that can measure the magnitudes of these two input signals. In this manner, the software that executes on the microcontroller 280 will be used to determine the relative strengths (i.e., voltage magnitudes) of these two input signals from channel 1 and channel 2.

As an alternative embodiment, the signals 340 and 342 (signals AC1 and AC2) from the AGC amplifiers 222 and 232 (on FIG. 9) can be configured to be directed to the same inputs on the microcontroller 280, instead of above-noted signals 350 and 352 (signals DC1 and DC2). In this alternative embodiment, the synchronous rectifiers 240 and 250 (on FIG. 11) would not be used, and the phase locked loop circuitry of FIG. 10 would not be used. Instead, a different type of waveform signal strength detector would be used, as discussed below in reference to FIGS. 20 and 21.

Microcontroller 280 also has digital inputs, and these include inputs from the three pushbutton switches on the array of switches 20 on the front panel of the modulated laser detector 10. Other inputs include a "TOP KEY" input from the front panel "top" pushbutton switch 22, and a "MID KEY" input from the front panel "middle" pushbutton switch 24. Microcontroller 280 also controls the "gain" outputs that in turn control the firing gates of the integrated circuits 224 and 234 (see FIG. 6), which respectively control the automatic gain amplifiers 222 and 232 that are illustrated on FIG. 9.

In addition to the above, microcontroller 280 also controls the appearance of the liquid crystal display 294, and it does so by sending control signals to an LCD driver chip, which is an integrated circuit generally designated by the reference numeral 290. The liquid crystal display 294 itself is shown schematically on FIG. 14. In addition, a "back plane" square wave signal drives the LCD display. Furthermore, a "Beep Drive" signal drives a D flip-flop 284, which generates a pair of double-ended signals to drive an audio beeper device, e.g., a piezoelectric element.

If the PIC18F242-I/SO(28) microprocessor/microcontroller chip is used, as illustrated on FIG. 12, then a programming port function can be provided. On FIG. 12, the pin-outs at 296 represent a programming port connector ("J500"), which can be interfaced with a programmer that can allow the system designer, or later a user, to enter upgrades to the system software if desired. A crystal clock oscillator circuit 282 is used with this style of microcontroller chip 280, in the illustrated embodiment.

Figure 15:
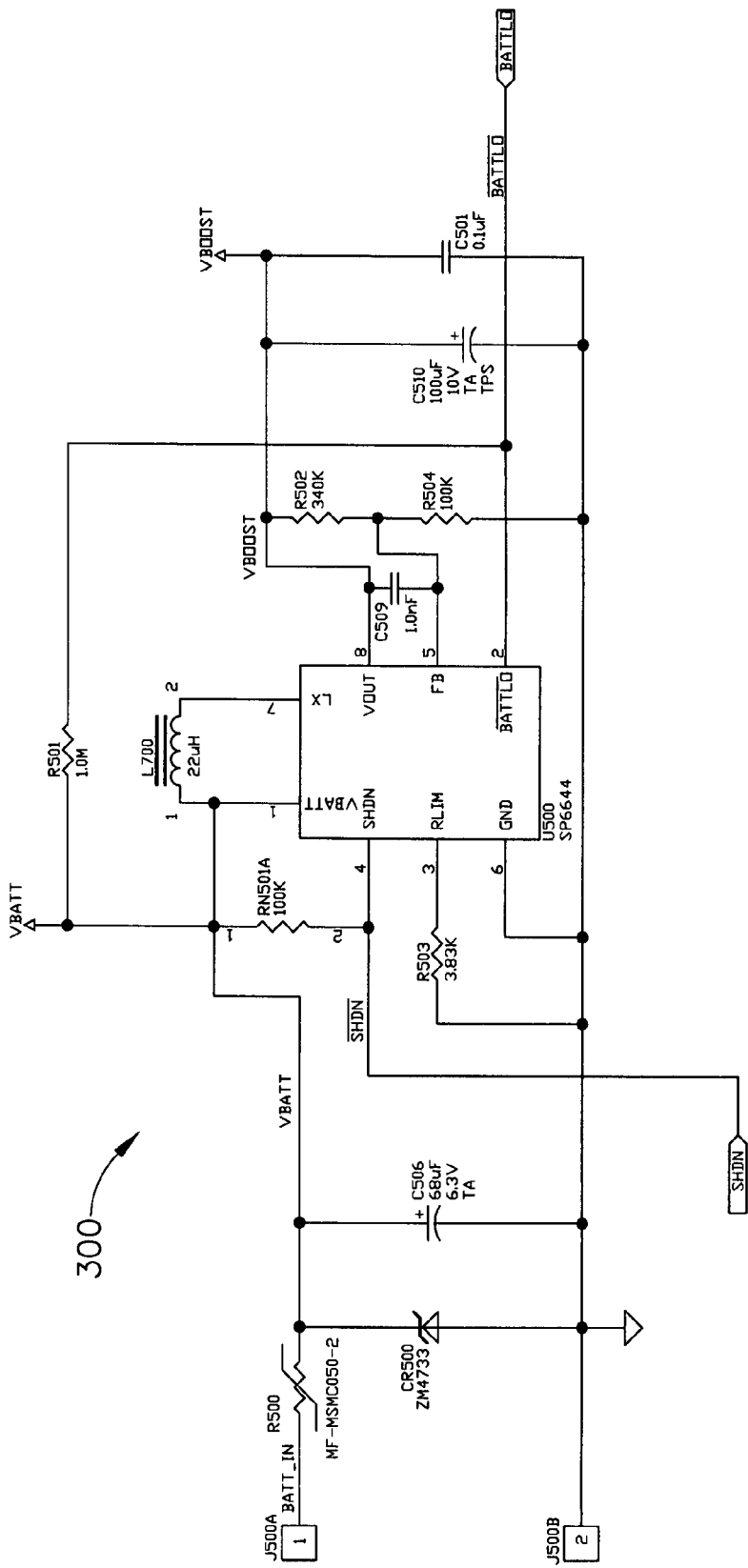
Figure 16:
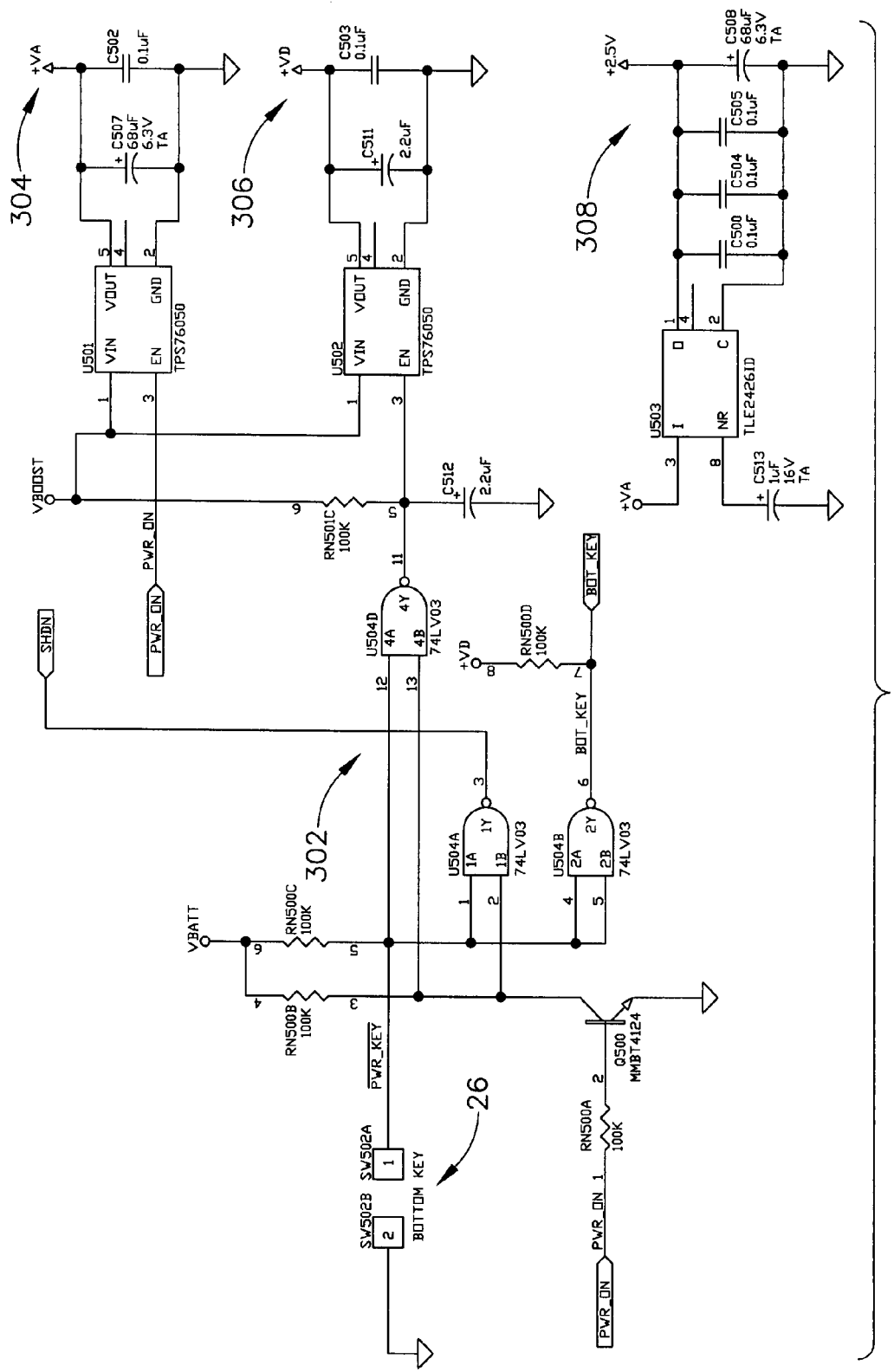

FIG. 15 illustrates some of the power supply circuit components, in which the first portion of the power supply is generally designated by the reference numeral 300. This portion of the power supply 300 boosts the battery voltage from about 3 volts DC up to a regulated value of about +5.5 volts DC. The power supply control circuit is illustrated on FIG. 16, and is generally designated by the reference numeral 302. The boost regulator 300 is designed to continue operating as the batteries begin to run down, even as low as 1 volt (instead of the nominal 3 volts). The power supply control circuit 302 is initiated by the ON-OFF pushbutton key 26, and is controlled by a PWR-ON signal from the microcontroller chip 280. There are multiple voltage regulator integrated circuits as part of the power supply, including regulators that provide an analog voltage source+VA (at reference numeral 304) and also a separate digital power supply rail+VD, as illustrated at the reference numeral 306. There is also a +2.5 VDC power supply rail at 308.

Figure 17:
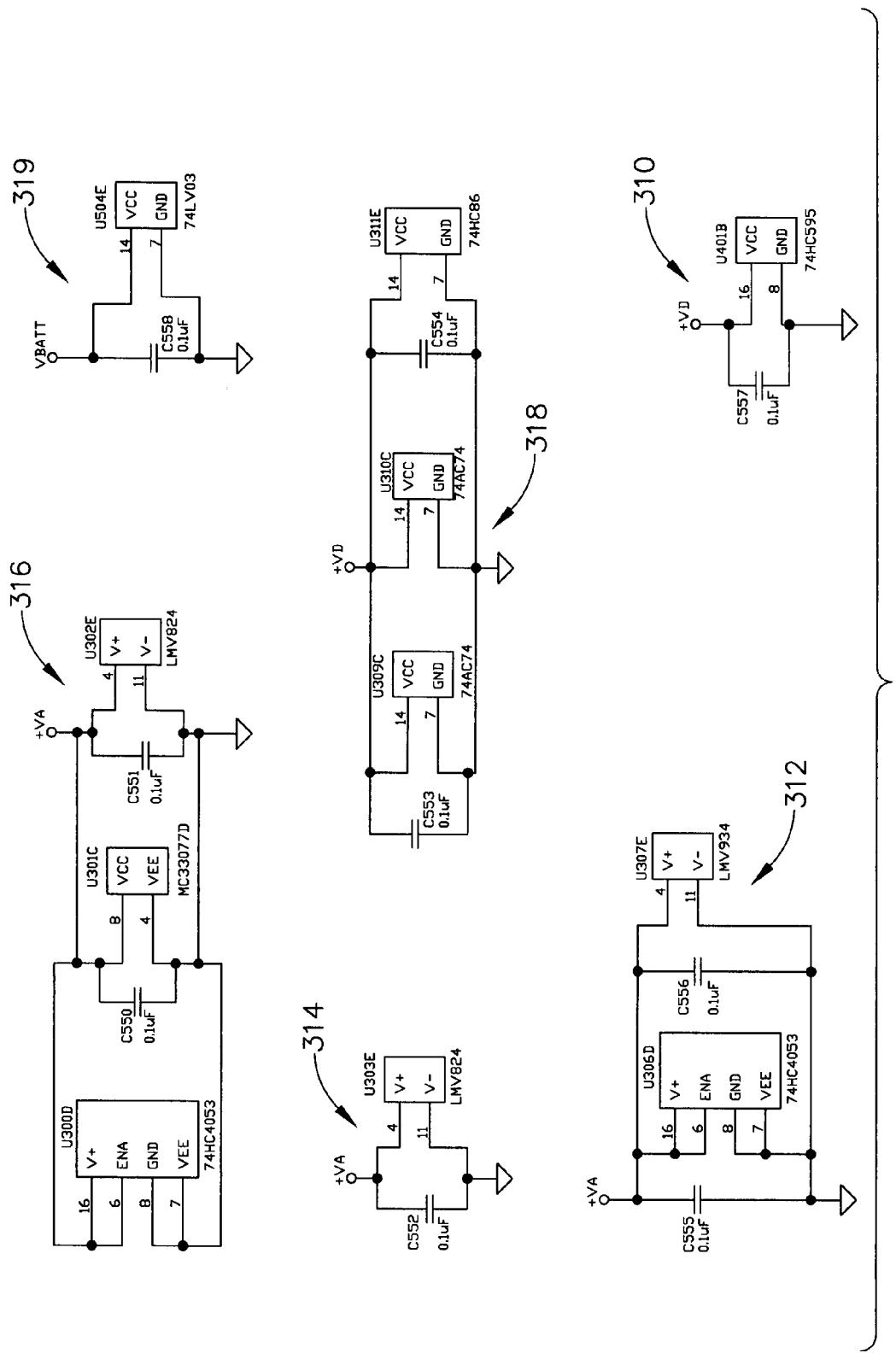
Figure 18:
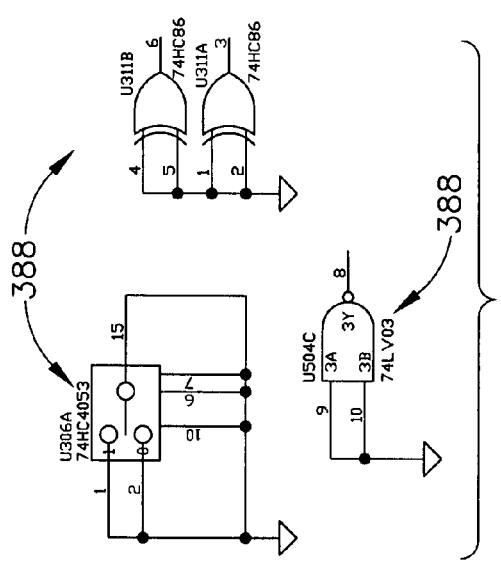

FIG. 17 shows several of the other power supply components, including power supply components 310, 312, 314, 316, 318, and 319. FIG. 18 illustrates a number of unused gates 388 that are part of the integrated circuits used in the electronic control circuit of the laser detector 10. Of course, these "extra" components could be available for other functions, if desired.

By use of the mixer along with an output filter that acts similar to an IF stage, the present invention improves the signal-to-noise ratio considerably. The low pass filter of FIG. 7 has a corner frequency of 400 Hz on either side of the carrier wave frequency, which would be a total noise bandwidth of 800 Hz. This would be much narrower than a modulated laser light receiver that, for example, had a noise bandwidth of 12 kHz, in the range of 4 kHz through 16 kHz.

In the present invention, the signal power is halved by using a combination of the mixers 60, 70 and the low pass filters 220, 230, which filter out the higher frequency component at 16.2 kHz in the example discussed above for the illustrated embodiment. (In this example, the modulation frequency of the laser light transmitter was 8.2 kHz, and the "local-OSC" signal that drives the mixer was 8.0 kHz.) With the signal power halved, then the signal level is lowered by the square root of two.

The noise level of the present invention as compared to a laser light receiver with the 12 kHz noise bandwidth characteristic is reduced by a factor of fifteen, which is the result of dividing 12 kHz by 800 Hz. Therefore, the noise power is reduced by the square root of fifteen, and the signal-to-noise ratio is improved by the square root of fifteen divided by the square root of two, which equals 2.74. This improves the distance that the laser receiver of the present invention can receive a relatively weak modulated signal by that factor of 2.74. In addition, the op-amps used in the present invention can be purchased having a lower gain bandwidth specification, since the output signal from the mixer is 200 Hz, rather than a much higher frequency.

In general, the present invention receives the laser light through a set of photosensors, which convert the light to an electrical signal. This signal is run through a tuned bandpass filter, which can include a low noise op-amp to improve the overall performance of the system. The output of this device is sent to the mixer and then through a filter that acts similar to an IF stage. In the present invention this filter can be a low pass filter, although a typical IF stage would use a bandpass filter. The signal is then run through a high gain amplifier, which in the present invention uses automatic gain control for improved performance. Finally, the signal is directed to a phase locked loop and also to a microcontroller or microprocessor. Part of the phase locked loop circuit uses a synchronous rectifier circuit for improved performance.

The above recitation of the circuit elements is just one embodiment of the present invention. As noted above, the present invention uses an amplifier system that is similar to a superheterodyne receiver. Certainly a classical superheterodyne amplifier could be used, in which the output from the mixer is directed through a bandpass filter rather than a low pass filter.

Figure 19:
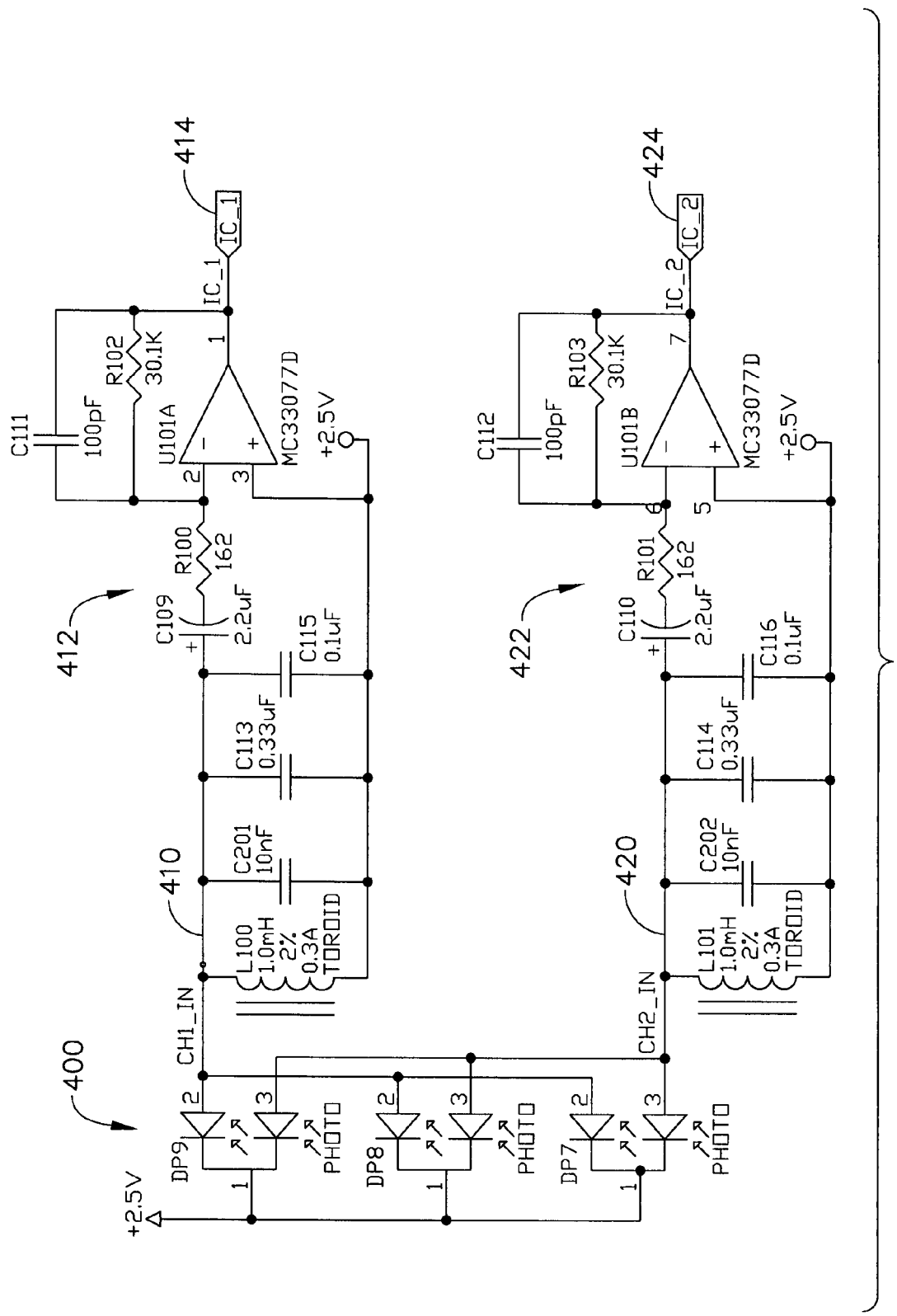
FIG. 19 is an electrical schematic of an alternative embodiment input stage, usable in the present invention, which uses a set of silicon substrates for the photodiodes that electrically form a single split-cell for a proportional modulated beam laser detector, as according to the principles of the present invention.

An alternative embodiment for the input circuit is illustrated as an electrical schematic on FIG. 19. This input circuit is generally designated by the reference numeral 400, and includes a set of photodiodes that comprise a photodetector array, such as the array 150 illustrated on FIG. 2. The photodetector array 400 operates as a proportional modulated beam detector front-end, and electrically will look like three silicon substrates that form a single optical split-cell. The output voltages are at 410 and 420, which are respectively referred to on FIG. 19 as CH_1-IN and CH_2-IN. After running through a band pass filter (either 412 or 422), these channel 1 and channel 2 signals 414 and 424 would become the signals that are input to the mixers 60 and 70, seen on FIGS. 7 and 8 which otherwise would be output from the low noise amplifiers 216 and 218. Once signals 414 and 424 reach this point on the schematic diagram of FIG. 18, they are passed on to circuit components that have been described above, such as the low pass filters with gain amplifiers 220 and 230, respectively.

Figure 20:
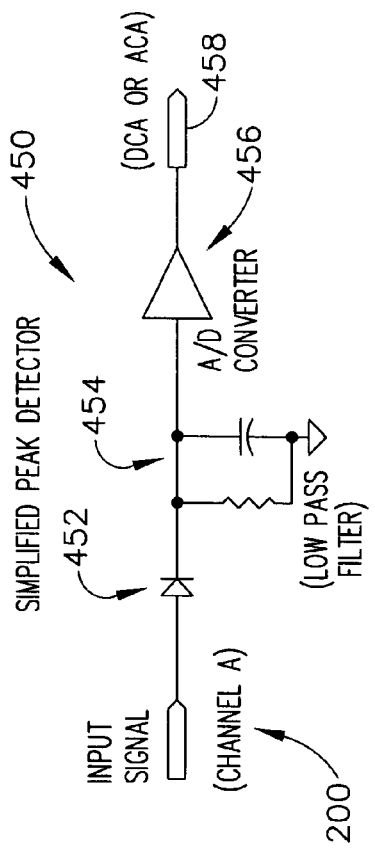
FIG. 20 is an electrical schematic of a simplified peak signal detector, usable in the present invention.

Referring now to FIG. 20, an alternative level detection circuit 450 is illustrated as an example of a simplified peak signal detector. For example, an input signal could arrive from a "Channel A" at 200 on FIG. 20 and then be directed through a diode 452, and then through a low pass filter 454. The signal would now be a substantially DC voltage level, which is then directed to an analog-to-digital converter 456. The output of this A/D converter 456 can then be directed to a microprocessor (or microcontroller), in which the ADC 456 output signal is at 458.

This type of peak detector circuit 450 could be used instead of the phase locked loop, phase comparator circuit, and other circuitry found on FIGS. 10 and 11 that were described above, which essentially comprise an averaging half-wave rectifier circuit. Of course, this simplified peak detector would likely have lower sensitivity, but it nevertheless could be used in certain applications.

Figure 21:
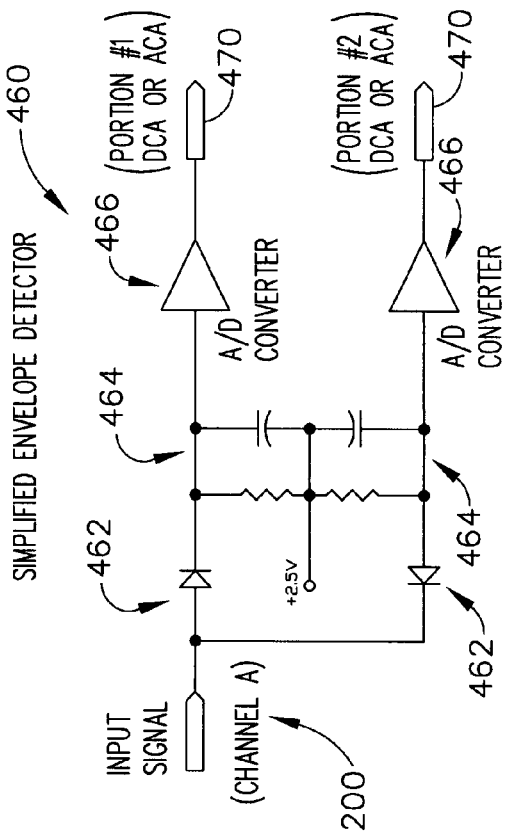
FIG. 21 is an electrical schematic of a simplified envelope signal detector, usable in the present invention.

Another alternative level detection circuit is illustrated in FIG. 21, which depicts a simplified envelope detector 460. An input signal arrives from a "Channel A" at 200, and is then directed through two different diodes 462, and further directed into two different low pass filters 464. These low pass filters are not connected to DC common or ground, but instead are directed to a +2.5 volts DC power supply rail, acting as a virtual ground, assuming the overall power supply rail of this circuit is at +5 volts DC. The two signals thereby produced by the low pass filters 464 will essentially be DC voltage level signals, and which would then be run into two separate analog-to-digital converters 466. The outputs of these two A/D converters are directed as signals at 470 to a microprocessor (or microcontroller) circuit, much like that described above in reference to FIG. 12.

This simplified envelope detector could also replace the phase locked loop, a phase comparator circuit, and other circuit elements found on FIGS. 10 and 11, as discussed above. As with the simplified peak detector of FIG. 20, the simplified envelope detector 460 would likely have less sensitivity than the embodiment described above that uses the phase locked loop circuit, but nevertheless could be used in certain applications.

It will be understood that the logical operations involving the automatic gain control circuits 222 and 232, the level detection functions, and the phase error detection functions that are performed by the microcontroller 280 could be implemented using sequential logic (e.g., using microprocessor or microcomputer technology), or using a logic state machine, or perhaps by discrete logic alone; it could also be implemented using parallel processors. One possible embodiment may use a microprocessor or microcontroller to execute software instructions that are stored in memory cells within an ASIC (an Application Specific Integrated Circuit). In fact, the entire microcontroller 280, along with RAM and executable ROM, may be contained within a single ASIC, in one mode of the present invention. Of course, other types of circuitry could be used to implement the logical operations and analog circuit functions depicted in the drawings without departing from the principles of the present invention.

It will be further understood that the precise circuits depicted in the schematic diagrams of FIGS. 6-21, and discussed above, could be modified to perform similar, although not exact, functions and mathematical operations without departing from the principles of the present invention. The exact nature of some of the circuit elements and logical operations of these circuit elements in FIGS. 6-21 are directed toward specific future models of modulated laser light detectors (those involving Apache Technologies, Inc. laser detectors, for example) and certainly similar, but somewhat different, steps would be taken for use with other types of laser detectors in many instances, with the overall inventive results being the same.

Figure 22:
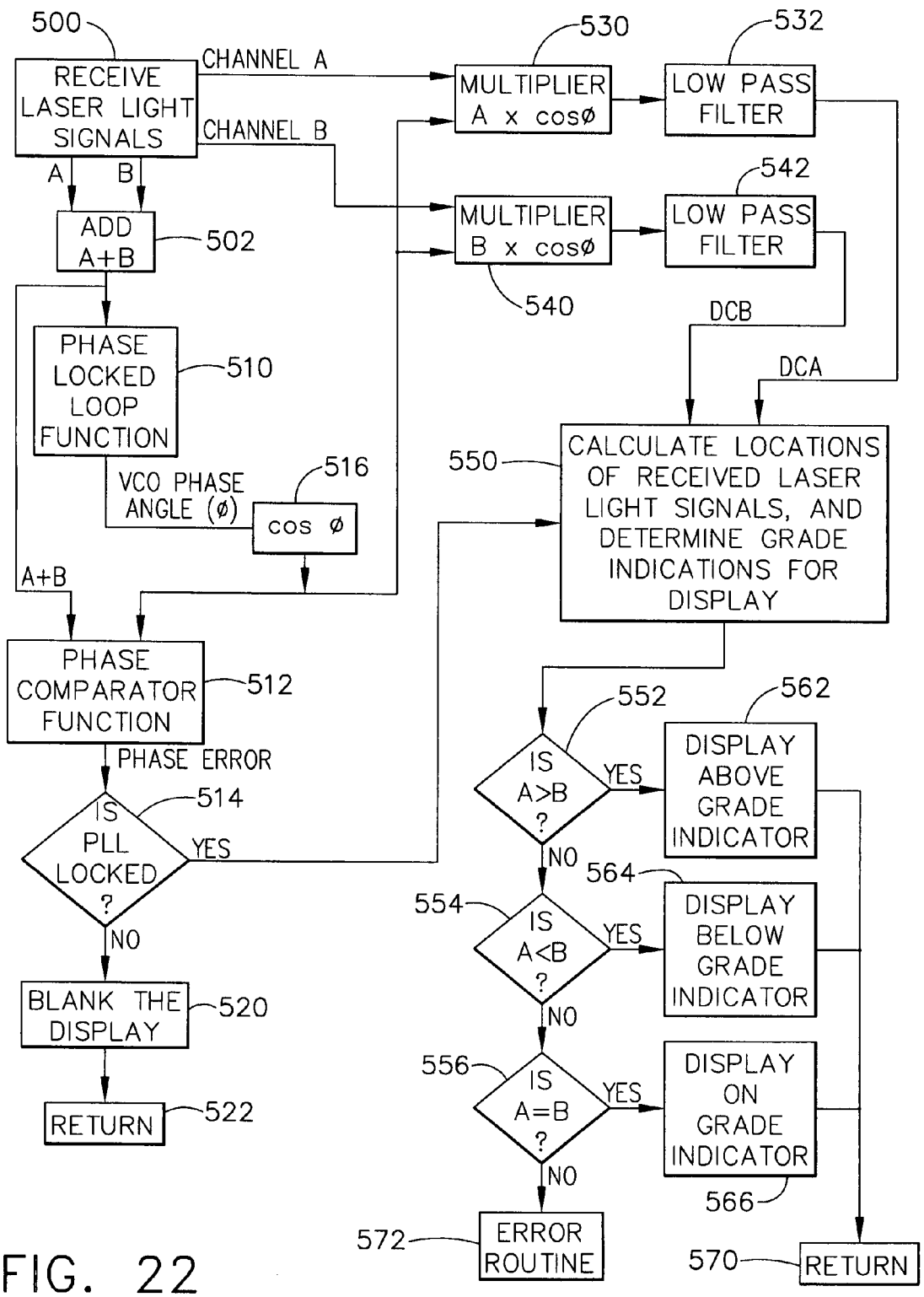
FIG. 22 is a flow chart that depicts some of the important logical steps for a first "software implementation" of the present invention, using a software "phase locked loop" algorithm.

The present invention could also be implemented mainly in software, while using a minimum of hardware circuit components. Of course, some type of photosensor would be required, such as a photodiode array (e.g., the array 50 of FIG. 6). However, some of the circuit elements such as a phase locked loop could be implemented in software, rather than in hardware. FIG. 22 illustrates a flow chart that shows some of the important logical steps involved in such a "software" implementation of the present invention.

Referring now to FIG. 22, beginning at a step 500 the laser light signals are received. These signals are split into two different channels, and in this flow chart these channels will be referred to as "Channel A" and "Channel B." These Channel A and Channel B signals represent digital numbers in this flow chart of FIG. 22, in which these digital numbers represent the signal strength or "level" of the received laser light signals for these two different channels. The two numeric values of Channel A and Channel B are added together at a step 502, and the summed result is directed to a phase locked loop function 510. The output of phase locked loop function 510 is a "VCO" phase angle (referred to herein as angle $\phi$), which is then directed to a cosine function at a step 516, which takes the cosine of $\phi$ ($\cos \phi$). The summed result of Channels A and B is also directed to a phase comparator function 512, as is the cosine of VCO phase angle value from the phase locked loop function 510 and the cos φ function at step 516. The phase comparator function 512 determines the present phase error, and this value is directed to a decision block 514 which determines whether or not the phase locked loop function is currently in a "locked" state.

If the phase locked loop is not currently locked, then the logic flow travels out the NO result to a step 520 which blanks the display, and then the logic flow is directed to a "return" step 522. That is the end of this routine for the time being. The routine will then be repeated in a periodic manner, or it could be interrupt driven. On the other hand, if the result from the decision step 514 was YES, then further computations are performed and the display will not be blanked.

The signals that represent the values of Channel A and Channel B are also directed to a pair of multiplier functions. Channel A is directed to a step 530 that also receives the cosine of the VCO phase angle (cos φ) via step 516. Therefore, this step 530 receives both the Channel A value and the cos φ value, multiplies those two numbers together, and directs the result to a low pass filter function at a step 532.

In a similar fashion, Channel B is directed to a multiplier step 540 which also receives the cost value from step 516. Step 540 multiples Channel B times cos φ, and directs the result to a low pass filter function at a step 542.

The outputs from the two low pass filter functions at steps 532 and 542 are designated as "DCA" and "DCB." These two values are directed to a step 550 which calculates the locations of the received laser light signals impacting the photosensors, and then determines the appropriate grade indications that should be displayed. As part of these calculations, the flow chart of FIG. 22 will provide certain details, as discussed below.

The determination of grade includes a decision step 552 that determines whether Channel A is greater than Channel B. If the result is YES, then a step 562 will display the "ABOVE GRADE" indicator on the display. If the result is NO at decision step 552, then the logic flow is directed to another decision step 554. In step 554, it is determined if Channel A is less than Channel B. If the answer is YES, then a step 564 will display the "BELOW GRADE" indicator. If the result is NO at step 554, then the logic flow is directed to another decision step 556.

At decision step 556, it is determined if Channel A is equal to Channel B. If the answer is YES, then a step 566 will display the "ON GRADE" indicator. After any of the display functions have been performed (i.e., functions 562, 564, or 566), then the logic flow is directed to a "Return" function at a step 570, and that is the end of this routine for now.

On the other hand, if the result at decision step 556 is NO, then the logic flow is directed to an Error routine at a step 572. In theory, this would never occur, because one of the grade indicators should always be invoked if the phase locked loop is locked and the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 572 would be provided only as a fall back position for a comprehensive computer program.

In an alternative form of the present invention that also is implemented mainly in software, the signal strength detector used in finding the laser beam detector position impacting on the array of photosensitive elements can be implemented in a different type of software algorithm. In FIG. 22, a software phase locked loop algorithm was discussed, and can be used for finding the beam position of the laser light striking the photodiode array, such as the array 50 of FIG. 1. The software phase locked loop algorithm requires a significant amount of processing power for the embedded microprocessor of the detection circuit, such as the microprocessor unit 280 depicted on FIG. 12. A different algorithm could be used that uses less processing power, and is now described below in conjunction with the flow chart of FIG. 23.

This second embodiment of a software algorithm for finding the beam position on the photodiode array uses a root mean square (RMS) calculation for determining the effective magnitude of the laser light striking one or more of the photodiode array elements, rather than using the phase locked loop algorithm that was described in reference to FIG. 22. This second embodiment RMS calculation is less processor time intensive, and thus a microprocessor of less capability could be used for this embodiment, if desired.

Since the frequency of modulation of the laser light source, and the local frequency reference of the laser detection device are both known, and they are controlled to a very high degree of accuracy, this RMS algorithm can be implemented in the form discussed below. In the present invention, the knowledge of these parameters allows the embedded microprocessor in the laser detector to sample the signal that is output from the IF stages of the laser detector circuit, in which the IF stages are discussed above as circuits 220 and 230, depicted on FIGS. 7 and 8, respectively. In general, the present invention uses a sampling rate that is an integer multiple of the IF frequency. By use of this arrangement, the required amount of processing power can be minimized when performing the function of determining the received signal magnitude of each channel of the laser detector.

In an exemplary embodiment, the RMS calculation uses a sampling rate of sixteen (16) times the IF frequency, and performs sampling over a sampling time interval that is equivalent to a total of four (4) cycles of the IF signal period. This is done for each channel of the IF signal, as described below in the flow chart of FIG. 23. For each sample, the square of the sample value is calculated and is added to a "sum value." When all sixty-four (64) samples have been taken, then squared and summed, the resulting "sum value" is divided by sixty-four, and the square root is taken of the result. This final value is used as the "steady state" signal magnitude for the channel that has been sampled during that particular sampling time interval. The RMS algorithm of the present invention is thus used to determine the effective magnitude of an AC signal, and outputs that effective magnitude in terms of an equivalent DC signal magnitude. This equivalent DC value is then used in the beam position calculations that take place in the laser detector unit.

It will be understood that the exact number of cycles or periods of the IF frequency that are sampled can be chosen by the system designer, and the number of samples taken per period can also be chosen by the system designer; different values could be used besides those discussed in this exemplary embodiment, all without departing from the principles of the present invention. Moreover, samples of the laser light signals could be taken at multiples of the laser modulation frequency instead of the IF frequency, if desired. This would, however, require much faster processing because the laser modulation frequency typically will be much higher than the IF frequency, at least in the general case for the present invention. However, the type of signal processing that uses the RMS calculation for these samples would work at both the laser modulation frequency or the IF frequency, or essentially for any multiple or division thereof, so long as the appropriate number of samples was taken per period of the modulation frequency or the IF frequency, or one of their harmonics or divisions.

Figure 23:
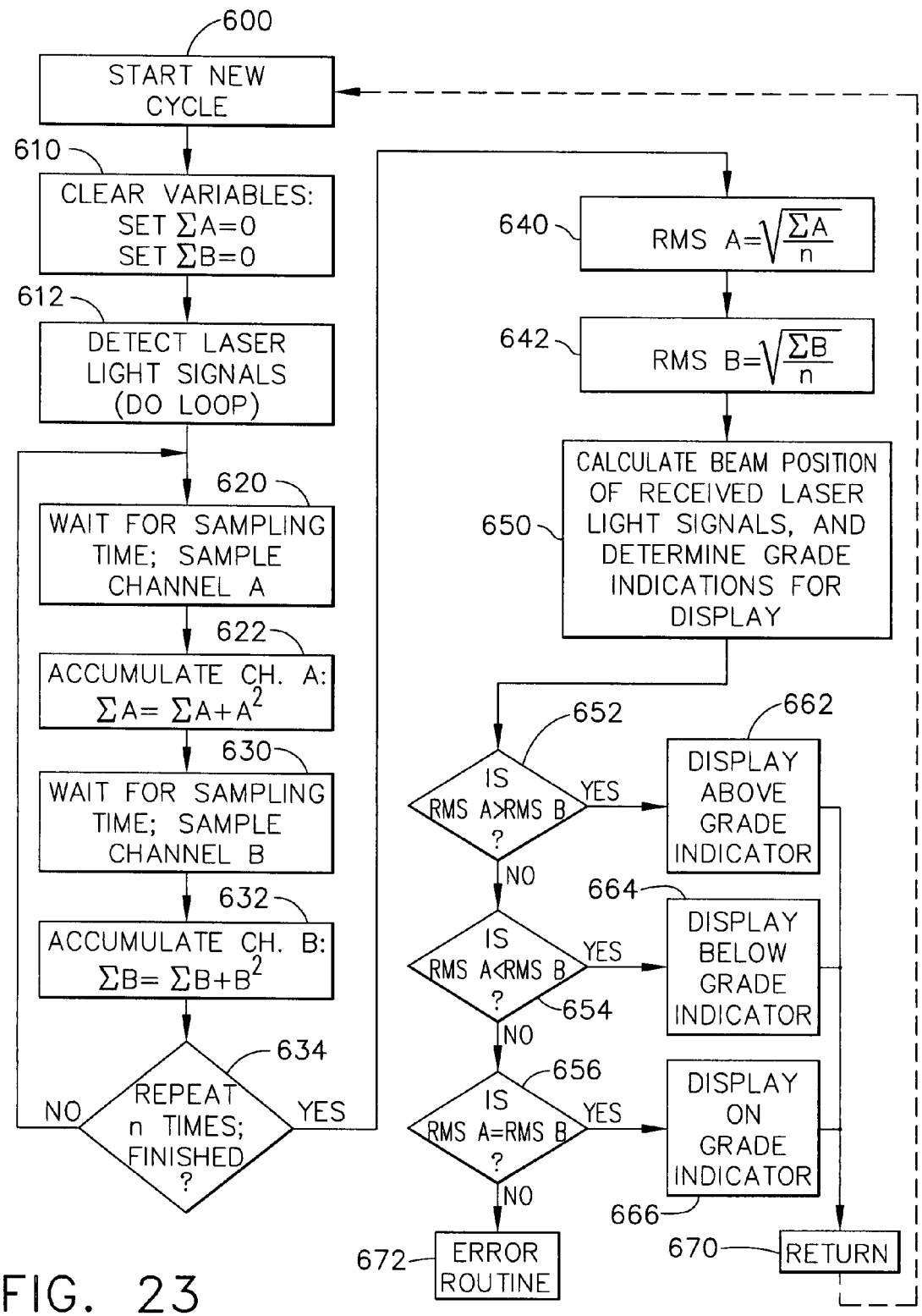
FIG. 23 is a flow chart that depicts some of the important logical steps for a second "software implementation" of the present invention, using an RMS calculation to determine an effective DC value of the AC signals running at the IF frequency.

Referring now to FIG. 23, beginning at a step 600 the laser light signals are received by the detector unit. These signals are split into two different channels, and in this flow chart those channels will be referred to as "Channel A" and "Channel B." These Channel A and Channel B signals represent digital numbers in the flow chart of FIG. 23, in which these digital numbers are related to the signal strength or "level" of the received laser light signals for these two different channels.

At a step 610, two buffers or memory locations are cleared for variables that will sum (or accumulate) the values for both Channel A and Channel B. On the flow chart, the variable for Channel A's summation (or accumulation) is referred to as $\Sigma A$, and the summation (or accumulation) value for Channel B signals is referred to as $\Sigma B$. These summation variables should be cleared at the beginning of each sampling time interval for the Channel A and Channel B laser light signals in this flow chart.

The next step 612 detects the laser light signals in a "do loop," in which the laser light signals are sampled multiple times for each channel. In this example, the channels are both sampled sixteen (16) times for a single period of the IF frequency. In addition, these sixteen (16) samples per period are to occur for four (4) continuous periods, which then provides a total of sixty-four (64) samples for each of Channel A and Channel B signals over the entire sampling time interval. (As noted above, the number of samples per IF period, or the number of IF frequency periods in the sampling interval could be changed without departing from the principles of the present invention.)

A step 620 now waits for the proper time to take a sample of the signals. At step 620, the Channel A signal is sampled at the appropriate time. The next step is at 622, in which this sample of Channel A is "accumulated" into the summation variable for the Channel A signals, which is the $\Sigma A$ variable. To accumulate the $\Sigma A$ variable, the value of Channel A is first squared, and that value is added into the $\Sigma A$ accumulation (or summation) variable. In this first pass since clearing the $\Sigma A$ variable, the end result of the accumulation (or addition) step is the first sampled value for Channel A, which is A2.

A step 630 now waits for the appropriate time to take a sample of the Channel B signal. After that occurs, a step 632 accumulates the Channel B signal values using a similar equation to that found in step 622 for Channel A. In step 632, the Channel B signal is first squared, and then added to the previous value that has been accumulated, which is the variable $\Sigma B$. In this first pass (since clearing the $\Sigma B$ variable at step 610), the end result of this accumulation step 632 will be the first sample value for Channel B signal squared, or B2.

A decision step 634 now determines whether or not the flow chart is finished with the sampling steps. In step 634, the number of samples is referred to by the variable "n" which can be any integer number, but as discussed above is equal to a value of sixty-four (64), in this example. Therefore, the "do loop" steps of 620, 622, 630, and 632 will be repeated sixty-four (64) times. If the logic flow has not finished repeating these steps sixty-four (64) times yet, then the result of this decision step 634 is NO. When that occurs, the logic flow is directed back to step 620, where the next samples are taken for both Channels A and B. On the other hand, if this logic flow has been repeated the correct total number of times (i.e., sixty-four times), then the result at step 634 is YES, and the logic flow is directed to a step 640.

Step 640 determines the root mean square value for Channel A. This is calculated by taking the summation of the Channel A values, $\Sigma A$, and dividing it by n, which is the value sixty-four (64) in this example. Once a square root of that is taken, the root mean square (RMS) value for Channel A has been determined.

A step 642 does essentially the same function for Channel B as step 640 did for Channel A. The $\Sigma B$ variable that has been accumulated over the sixty-four (64) samples is now divided by that number of samples n (which is sixty-four in this example), and the square root of that is taken to provide the output value for the root mean square (RMS) for Channel B.

As noted above, this RMS algorithm is used to determine the effective magnitude of what began as an AC signal (at the IF frequency in this embodiment) and outputs this value in terms of an equivalent DC magnitude. The effective DC value is then used in the beam position calculations, as discussed immediately below. For each channel, the initial samples taken represent instantaneous values of the AC signal's waveform and magnitude, and the "final" value that is output from the routine represents a steady state equivalent magnitude of the AC signal, during the sampling interval.

The determination of grade includes a decision step 652 that determines whether Channel A is greater than Channel B. If the result is YES, then a step 662 will display the "ABOVE GRADE" indicator on the display. If the result is NO at decision step 652, then the logic flow is directed to another decision step 654. In step 654, it is determined if Channel A is less than Channel B. If the answer is YES, then a step 664 will display the "BELOW GRADE" indicator. If the result is NO at step 654, then the logic flow is directed to another decision step 656.

At decision step 656, it is determined if Channel A is equal to Channel B. If the answer is YES, then a step 666 will display the "ON GRADE" indicator. After any of the display functions have been performed (i.e., functions 662, 664, or 666), then the logic flow is directed to a "Return" function at a step 670, and that is the end of this routine for now.

On the other hand, if the result at decision step 656 is NO, then the logic flow is directed to an Error routine at a step 672. In theory, this would never occur, because one of the grade indicators should always be invoked if the phase locked loop is locked and the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 672 would be provided only as a fall back position for a comprehensive computer program.

As noted above, portions of the present invention can be implemented mainly in software while using a minimum of hardware circuit components. In yet another alternative form of the present invention that is implemented mainly in software, the signal strength detector used in finding the laser beam detector position impacting on the array of photosensitive elements can be implemented in a different type of software algorithm. The flow charts of FIGS. 22 and 23 both discussed software algorithms that can be implemented in the embedded microprocessor of the detection circuit, such as the microprocessor unit 280 depicted on FIG. 12. Another different (third) algorithm could be used that uses even less processing power, and is now described below in conjunction with the flow chart of FIG. 24. This third embodiment of a software algorithm for finding the beam position on the photodiode array uses a Discrete Fourier Transform calculation for determining the effective magnitude of the laser light striking one or more of the photodiode array elements, rather than using the phase locked loop algorithm that was described in reference to FIG. 22, or the RMS calculation that was described in reference to FIG. 23. A microprocessor of less capability could be used for this third embodiment, if desired, even while implementing a more accurate algorithm for converting the incoming laser light signals into a numeric representation of the amplitude of a signal waveform. Using the principles of the present invention, the numeric value representation of the amplitude of the signal waveform can be determined while providing additional noise and out of band frequency rejection, and also requiring less processing power than many other forms of software calculations.

In this embodiment, a Discrete Fourier Transform (DFT) is used to calculate the numeric value representation of the amplitude of the signal waveform of the laser light striking the photodetector units. Although some DFT algorithms are known in the art for other engineering applications, the description below provides a simplified methodology for calculating these values, while not sacrificing accuracy to any significant degree when determining a numeric representation of the amplitude of a laser light signal.

Using the DFT algorithm of the present invention, an arbitrary input signal can be sampled and analyzed for its spectral content in a numeric manner. A time domain signal can be thought of as being composed of a number of sine waves of the proper frequencies, amplitudes, and phases, all summed together. A Fourier transform provides a mathematical means of converting a time domain signal into its component sine waves. When a time domain signal has been sampled with an analog-to-digital converter (ADC), the input signal is considered to be discrete in nature. This is true because any ADC will sample its input signal at a certain time interval, and the output is the instantaneous voltage of the input signal at the instant of sampling. No information is known about the input signal during the time between each sampling instance. While this might appear to be a great limitation, there is a large body of theoretical and practical knowledge in utilizing such discrete signal data streams and is well known in the field.

When using the DFT algorithm of the present invention, the arbitrary waveform is sampled in the time domain and the spectral components of the signal are calculated in the frequency domain. The signal to be sampled is generally periodic in nature when using the present invention, due to the modulation of the laser signal of the laser transmitter. As an example, many laser transmitters use a modulation frequency of 7812.5 Hertz. The laser beam is generally modulated with a square wave having a 50% duty cycle, and by the time the signal passes through the analog signal processing circuits of the laser detector, the signal that is sampled is generally a sinusoid in form. An appropriate form for the DFT equation for a sampled input signal that is periodic in nature is given below, in EQUATION #1:

$$X(mF) = \sum_{n=0}^{N-1} x(nT)e^{-j2\pi mnl \cdot T} \qquad \text{EQUATION \#1}$$

Where:
X=spectral component in the frequency domain
x=input signal in the time domain
n=input sample number
m=frequency component sample number
T=time increment between successive input signal samples (sampling interval (T=1/fs))
fs=sampling frequency
F=frequency increment between successive spectral components (fundamental frequency of the signal (F=1/tp))
tp=overall sampling interval time (for 64 samples, for example)
N=number of signal input samples (N=1/FT=fs*tp)

In EQUATION #1, it is assumed that the input signal is sampled over one full cycle of the periodic signal. Since both the laser transmitter and the laser detector employ a crystal oscillator with a very low frequency tolerance, the detector can synchronize its input sampling with the input signal to ensure that the detector sampling interval spans an integer number of input signal cycles. Using Euler's identity, and recognizing that the input sample sequence is real (i.e., no imaginary parts), the above equation can also be expressed below, as EQUATION #2:

$$X(mF) = \sum_{n=0}^{N-1} x(nT)\cos\left(\frac{2\pi mn}{N}\right) - j\sum_{n=0}^{N-1} x(nT)\sin\left(\frac{2\pi mn}{N}\right) \qquad \text{EQUATION \#2}$$

In the present invention, the magnitude of the spectral component is the only value of interest, so EQUATION #2 can be further developed as EQUATION #3:

$$|X(mF)| = \qquad \text{EQUATION \#3}$$
$$\sqrt{\left(\sum_{n=0}^{N-1} x(nT)\cos\left(\frac{2\pi mn}{N}\right)\right)^2 + \left(-j\sum_{n=0}^{N-1} x(nT)\sin\left(\frac{2\pi mn}{N}\right)\right)^2}$$

which can simplify to EQUATION #4, below:

$$|X(mF)| = \qquad \text{EQUATION \#4}$$
$$\sqrt{\left(\sum_{n=0}^{N-1} x(nT)\cos\left(\frac{2\pi mn}{N}\right)\right)^2 + \left(\sum_{n=0}^{N-1} x(nT)\sin\left(\frac{2\pi mn}{N}\right)\right)^2}$$

When using this DFT technique in the laser receiver application, it is necessary to consider the specific values that can be utilized in a laser receiver/laser transmitter system design. It is understood that the specific values discussed below are for presenting an example, and other values could be utilized without departing from the principles of the present invention.

In this example of the present invention, the value of interest is the magnitude of the laser signal that has a frequency of 7812.5 Hertz. This laser signal is mixed (as described above) with a local oscillator signal having a frequency of 7905.1 Hertz which, after passing through the low pass filter, results in an Intermediate Frequency (IF) signal of 92.6 Hertz, which has a period of approximately 10.8 milliseconds (msec). To reduce the effect of noise on the final calculated result, it is desirable to sample multiple cycles of the input signal. In this example, the IF signal will be sampled for four entire cycles. This means a sampling interval will be approximately 43.2 msec (tp=43.2 msec; F=23.15 Hertz). It was further decided in this example to sample the input signal at exactly sixteen (16) times the IF frequency, or at 1.48 kHz (fs=1.48 kHz; T=675.7 microseconds). The total number of input samples per sampling interval, therefore, is sixty-four (64) samples. In the flow chart of FIG. 24, discussed below, this number of samples is referred to as "n".

Since the magnitude of the fundamental component of the IF signal is the value of significant interest in this invention, the calculation of the entire DFT is not required; instead, merely a single value in the sequence of frequency components (or "DFT series elements") is needed. Also, since the DFT assumes that the sampling interval is one complete cycle of the periodic input waveform, and in this example four complete cycles of the IF input waveform are being acquired, then the spectral component of interest is not the fundamental value (m=1), but instead is the fourth element of the DFT series (m=4).

If the above specific values are substituted into EQUATION #4 and converted to references of the sample number in the sampling interval and spectral component in the spectral series {i.e., X(mF) becomes X(4); and x(nT) becomes x(n)}, the following equation is produced, as EQUATION #5:

$$|X(4)| = \sqrt{\left(\sum_{n=0}^{63} x(n)\cos\left(\frac{\pi n}{8}\right)\right)^2 + \left(\sum_{n=0}^{63} x(n)\sin\left(\frac{\pi n}{8}\right)\right)^2}$$  EQUATION #5

This equation is much more manageable than a software phase locked loop of a previous invention by the same inventor (see U.S. patent application Ser. No. 11/082,041 filed on Mar. 16, 2005, titled: "MODULATED LASER LIGHT DETECTOR WITH IMPROVED RANGE"). It nevertheless still is a challenge for a small eight-bit microprocessor to perform these calculations in real time. In the above example, a total of 128 trigonometric functions, 130 multiplications, 127 additions, and one square root operation must be performed in real time. For a practical approach, a further simplification is desired.

Such a simplification is possible when recognizing that the sine and cosine functions are repetitive, and in fact repeat four times. As a result, only a maximum of sixteen values are required in the magnitude calculation of EQUATION #5. Consequently, the IF input sample values can be summed into a total of sixteen partial summations, or "bins". Each of these summation bins can be expressed as follows, as EQUATION #6:

$$b(n) = \sum_{n=0}^{3} x(16s+n) \text{ where } 0 \le n \le 15$$  EQUATION #6

Where b=a partial summation (or "bin") of the input signal, in the time domain. Substituting this expression into EQUATION #5 yields the following EQUATION #7:

$$|X(4)| = \sqrt{\left(\sum_{n=0}^{15} b(n)\cos\left(\frac{\pi n}{8}\right)\right)^2 + \left(\sum_{n=0}^{15} b(n)\sin\left(\frac{\pi n}{8}\right)\right)^2}$$  EQUATION #7

The form of EQUATION #7 requires a total of thirty-two trigonometric functions, 34 multiplications, 31 additions, and one square root operation, which is a significant reduction in computational complexity. Further reductions in complexity can be achieved if one recognizes that many of the sine and cosine functions produce trivial results. In particular, EQUATION #8 below has values that reduce to zero (0):

$$\sin\left(\frac{0\pi}{8}\right) = \sin\left(\frac{8\pi}{8}\right) = \cos\left(\frac{4\pi}{8}\right) = \cos\left(\frac{12\pi}{8}\right) = 0$$  EQUATION #8 and some components reduce to a value of one (1), as in EQUATION #9, below:

$$\sin\left(\frac{4\pi}{8}\right) = -\sin\left(\frac{12\pi}{8}\right) = \cos\left(\frac{0\pi}{8}\right) = -\cos\left(\frac{8\pi}{8}\right) = 1$$  EQUATION #9

If these trivial results are recognized by the software, and redundant calculations are skipped, the DFT calculation is further reduced. The resulting calculation requires 24 trigonometric functions, 26 multiplications, 27 additions, and one square root function.

By recognizing the symmetry of the trigonometric functions, further reductions in computation complexity can be achieved. These symmetries are illustrated in EQUATION #10, #11, and #12, as follows:

$$\sin\left(\frac{\pi}{8}\right) = \sin\left(\frac{7\pi}{8}\right) = -\sin\left(\frac{9\pi}{8}\right) = -\sin\left(\frac{15\pi}{8}\right) =$$

$$\cos\left(\frac{3\pi}{8}\right) = -\cos\left(\frac{5\pi}{8}\right) = -\cos\left(\frac{11\pi}{8}\right) = \cos\left(\frac{13\pi}{8}\right)$$  EQUATION #10

$$\sin\left(\frac{2\pi}{8}\right) = \sin\left(\frac{6\pi}{8}\right) = -\sin\left(\frac{10\pi}{8}\right) = -\sin\left(\frac{14\pi}{8}\right) =$$

$$\cos\left(\frac{2\pi}{8}\right) = -\cos\left(\frac{6\pi}{8}\right) = -\cos\left(\frac{10\pi}{8}\right) = \cos\left(\frac{14\pi}{8}\right)$$  EQUATION #11

$$\sin\left(\frac{3\pi}{8}\right) = \sin\left(\frac{5\pi}{8}\right) = -\sin\left(\frac{11\pi}{8}\right) = -\sin\left(\frac{13\pi}{8}\right) =$$

$$\cos\left(\frac{\pi}{8}\right) = -\cos\left(\frac{7\pi}{8}\right) = -\cos\left(\frac{9\pi}{8}\right) = \cos\left(\frac{15\pi}{8}\right)$$  EQUATION #12

As a result, there are only three basic trigonometric values that are used in the calculations, provided that the sign of each value is manipulated correctly. These few values are easily stored in a Look-Up Table. Consequently, the calculations required to determine the magnitude of the spectral component are now reduced to 26 multiplications, 27 additions, and one square root function.

A final optimization can be achieved by rearranging the order of operations in the summations. Breaking down the magnitude equation into the real and imaginary parts produces the following equations, #13, #14, and #15:

$$|X(4)| = \sqrt{(X_R)^2 + (X_I)^2}$$  EQUATION #13 where $$X_R = \sum_{n=0}^{15} b(n)\cos\left(\frac{\pi n}{8}\right) \text{ and}$$  EQUATION #14

$$X_I = \sum_{n=0}^{15} b(n)\sin\left(\frac{\pi n}{8}\right)$$  EQUATION #15

By expanding both the real and imaginary parts of the spectral components in EQUATIONS #14 and #15, and taking advantage of the trivial sine and cosine values in EQUATIONS #8 and #9, as well as the symmetrical sine and cosine values as depicted in EQUATIONS #10, #11, and #12, this leads to a final optimization, as follows in EQUATIONS #16 and #17:

$$X_R = b(0) - b(8) + \sin\left(\frac{\pi}{8}\right)(b(3) - b(5) - b(11) + b(13)) + \quad \text{EQUATION \#16}$$
$$\sin\left(\frac{2\pi}{8}\right)(b(2) - b(6) - b(10) + b(14)) +$$
$$\sin\left(\frac{3\pi}{8}\right)(b(1) - b(7) - b(9) + b(15))$$

$$X_I = b(4) - b(12) + \sin\left(\frac{\pi}{8}\right)(b(1) - b(7) - b(9) + b(15)) + \quad \text{EQUATION \#17}$$
$$\sin\left(\frac{2\pi}{8}\right)(b(2) - b(6) - b(10) + b(14)) +$$
$$\sin\left(\frac{3\pi}{8}\right)(b(3) - b(5) - b(11) + b(13))$$

While EQUATIONS #16 and #17 appear much more complex, and certainly they are more complex to write, they are in fact much simpler computationally. The total computational requirements are 8 multiplications, 29 additions, and one square root operation. This is a much easier computation for a small microprocessor to perform in real time, and makes the DFT approach of the present invention possible in a low cost and low power product.

Figure 24:
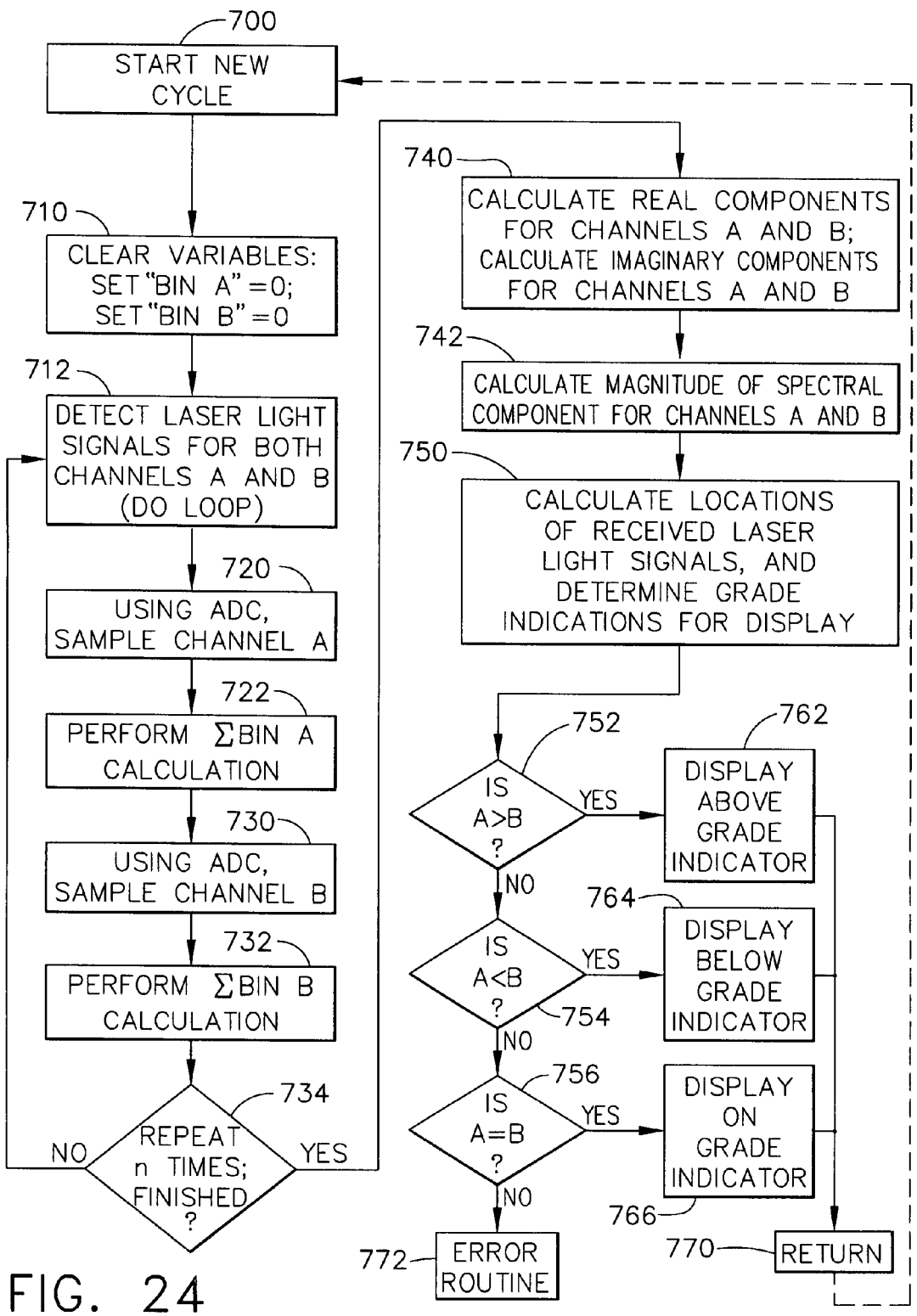
FIG. 24 is a flow chart that depicts some of the important logical steps for a third "software implementation" of the present invention, using a Discrete Fourier Transform calculation to determine a magnitude of the spectral components of the AC signals running at the IF frequency.

Referring now to FIG. 24, a flow chart is provided showing an example of the present invention. Starting at a step 700, a new cycle of calculations begins. The next step clears the variables at a step 710, in which the "BIN A" and "BIN B" values are all set to zero (0). These are the "summation bin" values that may have been calculated for a previous set of input samples, and now must be cleared for the "next" set of input samples.

A step 712 now detects the laser light signals for both Channel A and for Channel B in a series of computation and sampling steps. For Channel A, a step 720 samples Channel A using an analog-to-digital converter (ADC), and its periodically-sampled output signal is directed to a step 722 that performs a summation calculation for BIN A. An example of this BIN A summation calculation is represented above as EQUATION #6.

A similar set of steps 730 and 732 are performed to sample Channel B, again using the analog-to-digital converter (ADC). Step 732 performs the summation of BIN B calculations (referring again to EQUATION #6). A decision step 734 now determines if the detection routine is finished, and determines if it has been repeated n number of times. As described above, for this example samples will be taken sixty-four (64) times for Channel A, and sixty-four (64) times for Channel B.

When both channels have been sampled and their appropriate "BINS" filled with the proper number of calculations, the logic flow is directed to a step 740 that calculates the real components for both Channels A and B, and also calculates the imaginary components for both Channels A and B. Exemplary equations for doing this are EQUATIONS #16 and #17, presented above.

The logic flow now travels to a step 742 that calculates the magnitude of the spectral component for Channels A and B. An exemplary equation for doing this is EQUATION #13, presented above. These two magnitudes (for A and B) are now directed to a step 750 which calculates the locations of the received laser light signals impacting the photosensors, and then determines the appropriate grade indications that should be displayed.

The determination of grade includes a decision step 752 that determines whether Channel A is greater than Channel B. If the result is YES, then a step 762 will display the "ABOVE GRADE" indicator on the display. If the result is NO at decision step 752, then the logic flow is directed to another decision step 754. In step 754, it is determined if Channel A is less than Channel B. If the answer is YES, then a step 764 will display the "BELOW GRADE" indicator. If the result is NO at step 754, then the logic flow is directed to another decision step 756.

At decision step 756, it is determined if Channel A is equal to Channel B. If the answer is YES, then a step 766 will display the "ON GRADE" indicator. After any of the display functions have been performed (i.e., functions 762, 764, or 766), then the logic flow is directed to a "Return" function at a step 770, and that is the end of this routine for now.

On the other hand, if the result at decision step 756 is NO, then the logic flow is directed to an Error routine at a step 772. In theory, this would never occur, because one of the grade indicators should always be invoked if the display is not blanked. The prerequisites for such a state would normally mean that the laser light is impacting at least one of the photodiodes in the photosensor array, and therefore the detection system should always be able to determine whether or not the receiver is physically positioned above grade, below grade, or on grade. The error routine 772 would be provided only as a fall back position for a comprehensive computer program.

It should be noted that the sampling for both Channels A and B should be performed together in real time so that both channels take their samples while receiving the same modulated laser light strike on the photodetector elements. Two separate analog-to-digital converters (ADCs) could be used to capture the samples virtually simultaneously, although that is not necessary. Instead, the samples could be interleaved, such that Channel A is first sampled, then Channel B, then back to Channel A, then Channel B, and so on, all using a single ADC device.

While two parallel processors could be used with two ADCs to speed up the sampling and calculating processes, this should not be necessary for most commercial applications when using the present invention, particularly since one of the goals of the present invention is to provide a simpler computation to acquire the necessary information. Certainly the BIN A summation and BIN B summation calculations of steps 722 and 732 could be performed sequentially, once the actual samples have been gathered for both Channel A and Channel B at steps 720 and 730.

Any of the above "software solutions" or software implementations for increasing range and sensitivity can be used in a laser light detector that is also capable of rejecting reflections of laser light beams that may occur during indoor uses of a laser beam detecting system, particularly in situations where the laser detector and the laser transmitter are at short distances from one another. When reflections occur, the detector essentially receives spurious laser power due to these reflections, and if steps are not taken, such spurious laser power can interfere with the desired operation of a laser detector in rotating laser transmitter applications and in modulated laser transmitter applications. The present invention recognizes that the primary problem with reflected laser light power involves reflections from diffuse reflecting surfaces. These surfaces often are materials such as painted walls, light-colored clothing, and similar objects that have relatively small amounts of specular reflections; moreover, any reflections tend to primarily be diffuse in nature.

When a laser detector is exposed to such diffuse reflected laser power, the intensity of the laser power will be fairly uniform over the entire area of the photodetector array of the laser receiver/detector device. This will hold true so long as the laser detector is maintained at least at some minimum distance from the reflecting surface, and if there is a small amount of specular reflection from that surface. The present invention utilizes a method to determine if the laser detector is in the presence of an essentially uniform laser field. Therefore, the present invention can determine that this type of laser power is likely to be reflected laser power, and therefore, should be rejected (i.e., ignored).

Figure 25:
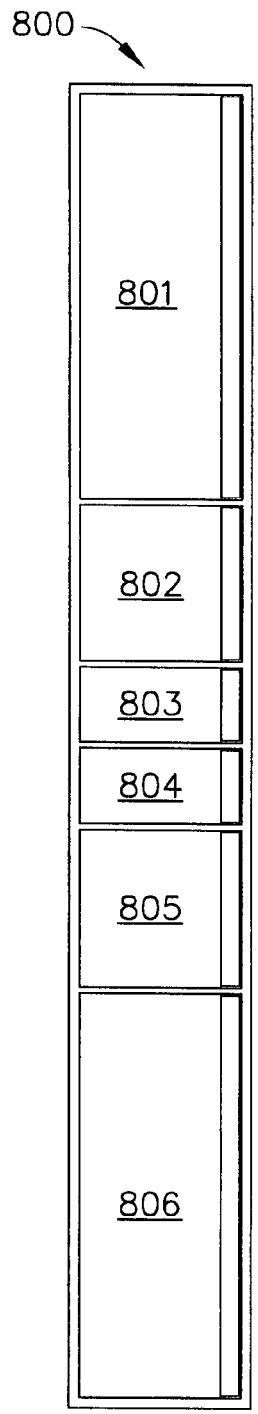
FIG. 25 is a diagrammatic view of a photocell used in a laser receiver constructed according to the principles of the present invention, in which there are six separate active regions or areas of the cell.
Figure 26:
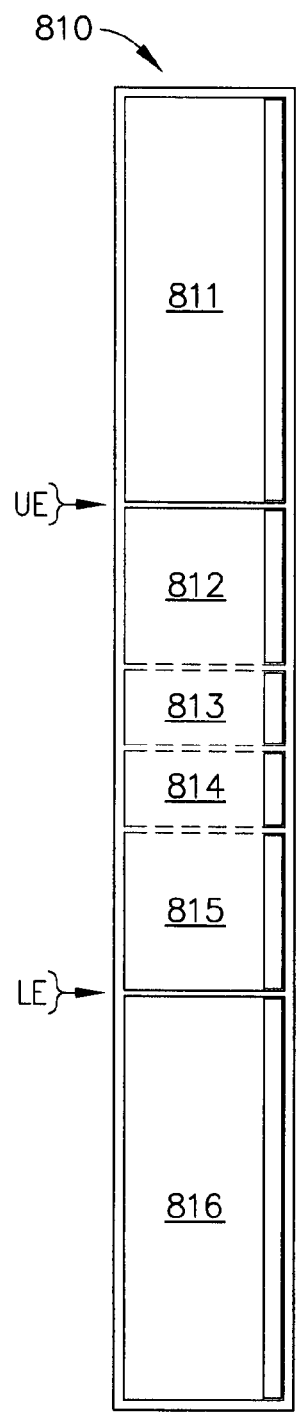
FIG. 26 is a diagrammatic view of the photocell of FIG. 25, showing how some of the active areas can be electrically connected to provide a first deadband that is rather wide.

The method of the present invention sometimes can be implemented with only a small modification to laser detector devices described in earlier patent applications and patents assigned to Apache Technologies, Inc., and also involving the software solutions described above. In such laser detector devices, the photodetector array can comprise at least three elements, as shown in FIGS. 25-30. Referring now to FIG. 25, a photodetector array generally designated by the reference numeral 800 is illustrated, having six separate active sensing areas or regions of photodetector elements at 801, 802, 803, 804, 805, and 806. Each of these regions 801-806 can be electrically separate devices, and thus there could be six separate output signals in parallel, if desired. However, it is typical to electrically connect some of these regions in parallel with one another, thus creating different active sensing areas of such photocell regions. An example of this is illustrated in FIG. 26.

FIG. 26 shows another photocell subassembly generally designated by the reference numeral 810, having individual photocell active sensing regions or areas 811, 812, 813, 814, 815, and 816. If desired, the photocell areas/regions 812, 813, 814, and 815 can be electrically connected in parallel, and thus comprise a larger but single output signal for a "mid-position" photocell area. This would provide three photocell areas, in which the top-cell is at reference numeral 811, the bottom-cell is at reference numeral 816, and the mid-cell is the parallel-connected areas 812-815. This could provide a deadband having an upper edge at the letters UE, and a lower edge at the letters LE. This would provide a rather wide deadband for such a three-part photocell.

Figure 27:
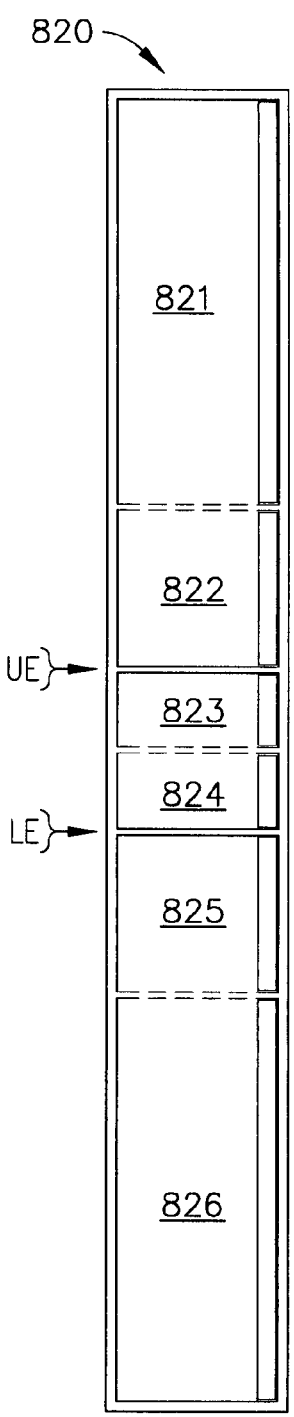
FIG. 27 is a diagrammatic view of the photocell of FIG. 25, showing how some of the active areas can be electrically connected to provide a first deadband that is rather narrow.

FIG. 27 shows the same photocell subassembly, now generally designated by the reference numeral 820, comprising photocell areas/regions 821, 822, 823, 824, 825, and 826. These photocell regions, however, are electrically connected differently, such that the mid-cell only comprises the active sensing areas 823 and 824, thereby producing an upper edge at the letters UE and a lower edge at the letters LE, which can be seen on the drawings as a much smaller or narrower deadband. The upper-cell region on FIG. 27 would comprise the active sensing areas 821 and 822, which are electrically connected in parallel. The lower-cell region would comprise the active sensing areas 825 and 826, which are electrically connected in parallel.

The illustrations of FIGS. 25-27 are provided merely to make clear the possibility of electrically connecting various photocell areas in more than one physical manner to produce different deadbands. This often is a user-selectable function of many conventional laser detectors.

Referring now to FIG. 28, another photocell subassembly is generally designated by the reference numeral 818, and includes five individual photocell areas/regions. In the photocell subassembly 818, the uppermost region is referred to as "A1", the lowermost cell is referred to as "A2", and the mid-portion is split into three separate photocell areas. On FIG. 28, the three separate photocell areas are designated "A1", "A3", and "A2". In this arrangement, the upper edge of the deadband is at UE and the lower edge is at LE. When comparing this to FIG. 29, the deadband of FIG. 28 is larger in size.

FIG. 29 illustrates another photocell subassembly generally designated by the reference numeral 828. As in FIG. 28, the uppermost or top-most cell is designated "A1" and the lowermost cell is designated "A2". The mid-cell on FIG. 29 also has three separate active sensing areas or regions, however, these areas/regions are not of equal sizes, thereby providing a narrower deadband, as can be seen at the upper edge designated UE and the lower edge designated LE.

In the present invention, it sometimes is typical to use the photocell areas in more than one "phase" of operation. During a first strike of a rotating transmitter laser beam impacting the photocell detectors, or during a first sampling interval of a modulated laser beam, the first phase (or "phase 1") will electrically connect the active sensing areas A1 and A3 to produce a "Channel A" output signal. A "Channel B" output signal will be produced by the active sensing areas A2. In a second phase of operation (also referred to as "phase 2"), the photocells will be electrically connected in a different manner by solid state switches. In phase 2, Channel A has a signal produced only by the active sensing areas A1, while Channel B has the signals produced by the active sensing areas A2 and A3. Phase 2 occurs when a second strike of the modulated laser beam impacts the photocell detectors of the same laser receiver unit, or during a second sampling interval of a modulated laser beam.

It will be understood that the phase 1 and phase 2 operations can occur with either size deadband, and thus can occur for both FIG. 28 and FIG. 29, as illustrated on the drawings. In other words, phase 1 for FIG. 28 has Channel A produced by the signals from active sensing areas 1 and 3, and Channel B is from the photocells from active sensing area A2. In the same laser receiver, the phase 2 operation also applies to FIG. 28, and in phase 2 Channel A is the output signal from only active sensing area A1, while Channel B is the output signal from active sensing areas A2 and A3. The same is also true for FIG. 29. This type of alternating operation is sometimes referred to in the industry as a "ping-pong" operation of the photocells. It is an inexpensive way of achieving greater sensitivity by using the same photocell areas to produce two different phases of output signals, rather than having "fixed" or "hard-wired" additional regions of photocell areas to produce the various optoelectric signals required by the laser receiver electronics.

When using the photocells depicted in FIGS. 25-29, the first element or active sensing area is connected to a first amplifier and signal processing channel, and the second element or active sensing area is connected to a second amplifier and signal processing channel. The "third element" is the element being switched, and is connected via solid state switching elements to either the first amplifier/signal processing channel (e.g., Channel A) or to the second amplifier/signal processing channel (e.g., Channel B). As discussed above, this switchable connection is toggled between the two channels at regular time intervals to determine if the laser beam position is within the center "deadband" of the laser detector unit. This method is very similar to that described in an earlier patent by the same inventor, U.S. Pat. No. 5,486,690.

During normal operation for the laser receiver unit, the signal magnitude for each amplifier/signal processing channel is measured and averaged for each of the two conditions of the center photodetecting element that becomes connected (through switches) to each of the two amplifier/signal processing channels. If the laser detector is in the presence of a uniform laser power field (and therefore probably is receiving reflected laser power), then the magnitude of the signal received by each amplifier/signal processing channel will be proportional to both the total active sensing area of the photodetector elements currently connected to that channel, and also to the intensity of the laser field. This will be true even if there are additional amplifier/signal processing channels, or if a particular channel is dedicated to the center cell. In other words, there can be three channels in which the center cell is a dedicated output, or perhaps four channels, in which there are two center cells that either could be dedicated, or they could be operated in a ping-pong manner, if desired.

In order to detect the uniform laser power field condition, the processing unit first calculates a numeric value for the ratio of the signal amplitude of each channel to the sum of the two channels for each of the two center photodetector connection phases (e.g., phase 1 and phase 2). The ratios of the channels are then compared to the ratios of the active sensing areas of the photodetectors that are connected to each channel during each of the two connection phases. If the numeric values for the signal ratios of each channel in each phase are essentially the same as the numeric values for the ratios of the active sensing areas of the photodetectors connected to each channel during each of those connection phases, then the receiver unit is almost certainly in a uniform laser power field which is almost certainly the result of diffuse reflections, and therefore, should be rejected (i.e., ignored).

As an example, the upper and lower photodetecting elements may each have active heights of 0.92 inches, and the center photodetecting element may have an active height of 0.08 inches. See FIG. 29 for an example of this type of arrangement. (Note that this would be for a narrower deadband mode.) If the active width is essentially the same for all of the photodetecting elements, which is normally the case, then the ratio of the active sensing areas is proportional to the ratio of the active heights of these photocells. The active sensing areas will have a predetermined spatial pattern, whether or not the active width is essentially equal for all cells (i.e., the system designer would know in advance the sizes and spatial pattern of the active photocells for a given laser receiver unit). Also, the active sensing areas will each have a physical size (and again the system designer would know in advance the sizes and spatial pattern of the active photocells for a given laser receiver unit). In this example, the ratio of the upper active sensing area to the total area when the center active sensing area is connected to the lower channel is as follows:

$$R1 = A1/(A1+A2+A3) = 0.92/(0.92+0.08+0.92) = 0.479 \quad \text{EQUATION \#18}$$

The ratio of the active sensing areas when the center active sensing area is connected to the upper channel is as follows:

$$R2 = (A1+A3)/(A1+A2+A3) = (0.92+0.08)/(0.92+0.08+0.92) = 0.521 = 1-R1 \quad \text{EQUATION \#19}$$

In an actual implementation, the laser receiver unit can have two different deadband sizes available, which essentially can be accomplished by changing the size of the center active sensing area. For example, the center active sensing area could be changed from 0.08 inches to an active sensing area of 0.24 inches for a wide deadband mode. (See FIG. 28 for such an arrangement.) When the center active sensing area is 0.24 inches in height, then the corresponding ratio of active sensing areas when the center active sensing area is connected to the lower channel is as follows:

$$R3 = A1/(A1+A2+A3) = 0.84/(0.84+0.24+0.84) = 0.437 \quad \text{EQUATION \#20}$$

The ratio of active sensing areas when the center active sensing area is connected to the upper channel is as follows:

$$R4 = (A1+A3)/(A1+A2+A3) = (0.84+0.24)/(0.84+0.24+0.84) = 0.563 = 1-R3 \quad \text{EQUATION \#21}$$

When the center active sensing area is connected to the lower channel, the channel outputs are as follows: Ch1 $\alpha$ A1; and Ch2 $\alpha$ (A2+A3).

When the center active sensing area is connected to the upper channel, the channel outputs are as follows: Ch1 $\alpha$ (A1+A3); and Ch2 $\alpha$ A2.

Transforming the equations for R1 and R2 above into terms of Channel 1 and Channel 2 becomes as follows:

$$S1 = Ch1/(Ch1+Ch2) = 0.479 \quad \text{EQUATION \#22}$$

(when the center active sensing area is connected to Channel 2 or Channel B)

AND $$S2 = Ch2/(Ch1+Ch2) = 0.521 \quad \text{EQUATION \#23}$$

(when the center active sensing area is connected to Channel 1 or Channel A).

The equations for R3 and R4 are transformed similarly. In operation, the processing unit calculates the numeric values for ratios R1 and R2, and if they are both substantially equal to the numeric values for the received signal ratios for the uniform laser field condition, then the received signals should be ignored. By doing so, the laser power received as a result of diffuse reflections is rejected.

Referring now to FIG. 30, another photocell subassembly generally designated by the reference numeral 830 is illustrated, having active photocell areas 831, 832, and 833. This photocell is to be a "hard-wired" photocell, and is to have three separate output channels. Channel A will be the output signal produced by the photocell area "A1", Channel B will be the output signal produced by the photocells in the active sensing area "A2", and Channel C will be the output signal produced by the photocells in the active sensing area "A3". These active sensing areas A1, A2, and A3 directly correspond to the actual area of the photocell regions 831, 832, and 833. In this arrangement, the deadband is fixed, rather than adjustable, and has an upper edge at UE and a lower edge at LE, which are the horizontal boundaries of the middle active cell 832.

This type of "hard-wired" photocell input arrangement can be used in a laser receiver that is designed to receive modulated laser signals that typically would occur either continuously or at a regular periodic interval, while also being capable of rejecting interference caused by strobe lights in the vicinity of the laser receiver. When rejecting strobe light sources, three input channels can be used to continuously sample for incoming laser beams, which usually is desirable because strobe light interference typically is an instantaneous event. In this configuration, the above EQUATIONS #18 and #19 are still used to determine the ratios R1 and R2. However, the equations for determining the numeric values for the signal strength ratios of the actual laser light received signals are no longer those equations above for EQUATIONS #22 and #23, but instead are the following:

$$S1 = Ch1/(Ch1+Ch2+Ch3) \quad \text{EQUATION \#24}$$

AND $$S2 = (Ch1+Ch3)/(Ch1+Ch2+Ch3) \quad \text{EQUATION \#25}$$

It should be noted that the above arrangement in reference to FIG. 30 will also work with a continuous modulated laser beam.

Figure 31:
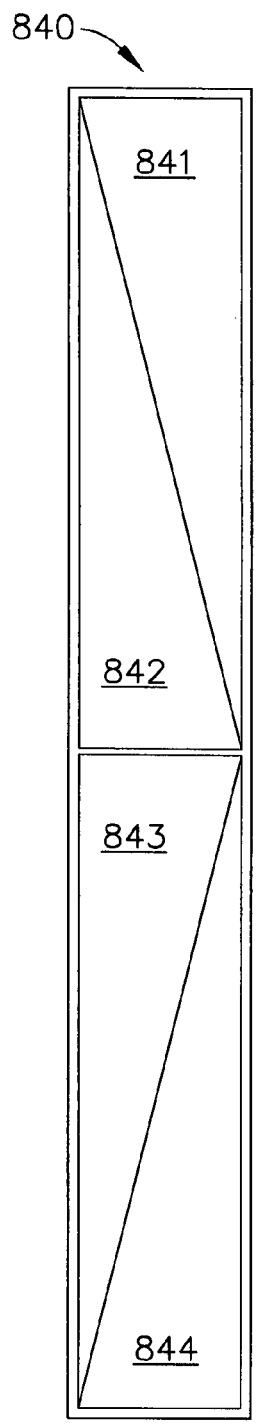
FIG. 31 is a diagrammatic view of a split-cell photocell subassembly used in a laser receiver constructed according to the principles of the present invention, in which the active areas are divided at the mid-point of the vertical longitudinal distance along the cell.

Referring now to FIG. 31, another photocell arrangement generally designated by the reference numeral 840 is depicted, in which this is a split-cell device. The "top half" of photocell 840 comprises two separate active sensing areas 841 and 842. The "bottom half" of this photocell 840 comprises two other active sensing areas 843 and 844.

Figure 32:
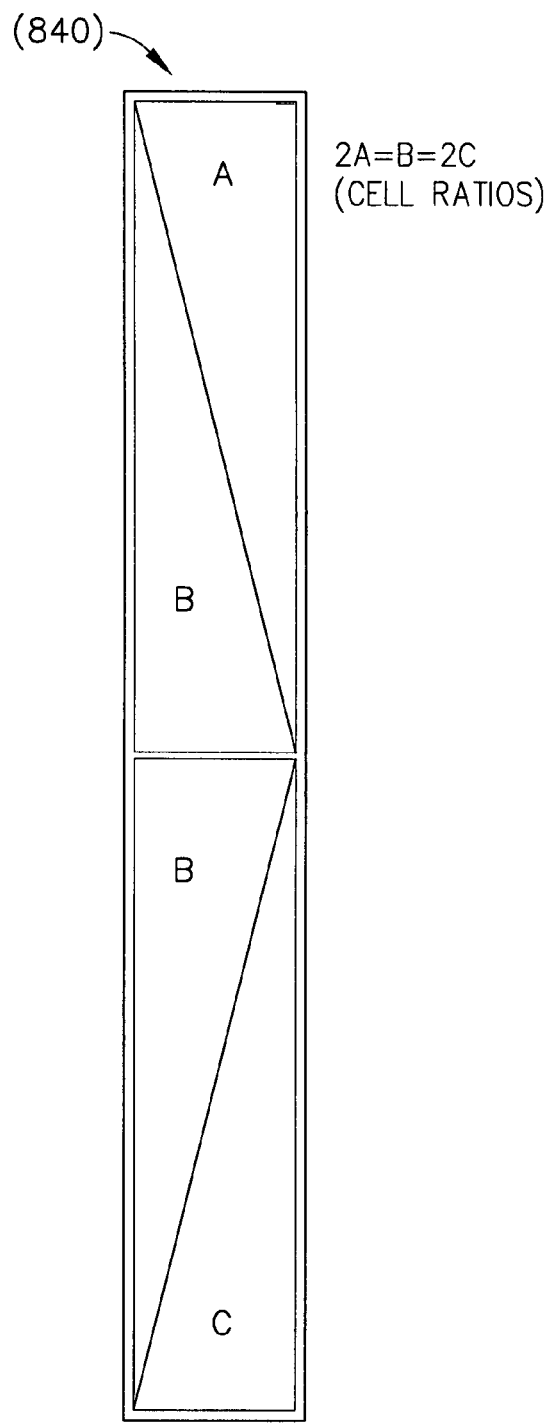
FIG. 32 is a diagrammatic view of the photocell of FIG. 31, showing the areas for each of the cell ratios.

Referring now to FIG. 32, the same photocell 840 is again illustrated, this time showing the active sensing areas as letters rather than as reference numerals. The active sensing area 841 is now referred to as area "A"; the active sensing area 842 is now referred to as "B"; the active sensing area 843 is now also referred to as "B"; and the active sensing area 844 is now referred to as the area "C". The ratios of these physical areas is important, and in this application, the ratio of the active sensing areas has the following relationship:

2A=B=2C.

When used in a reflection rejection methodology of the present invention, the signal strength of the cells with these ratios of active sensing area will be determined for three different input channels. The two areas B (i.e., areas 842 and 843) produce an electrical signal for one channel (e.g., Channel B), the cell area A will produce an electrical signal for a second channel (e.g., Channel A), and the cell area C will produce an electrical signal for a third channel (e.g., Channel C).

No switching of these input channels is required, so a reflection rejection calculation can occur each time a laser signal is detected. This type of photocell configuration can work with a continuous modulated beam and also, of course, with a repeatable rotating laser beam signal.

Figure 33:
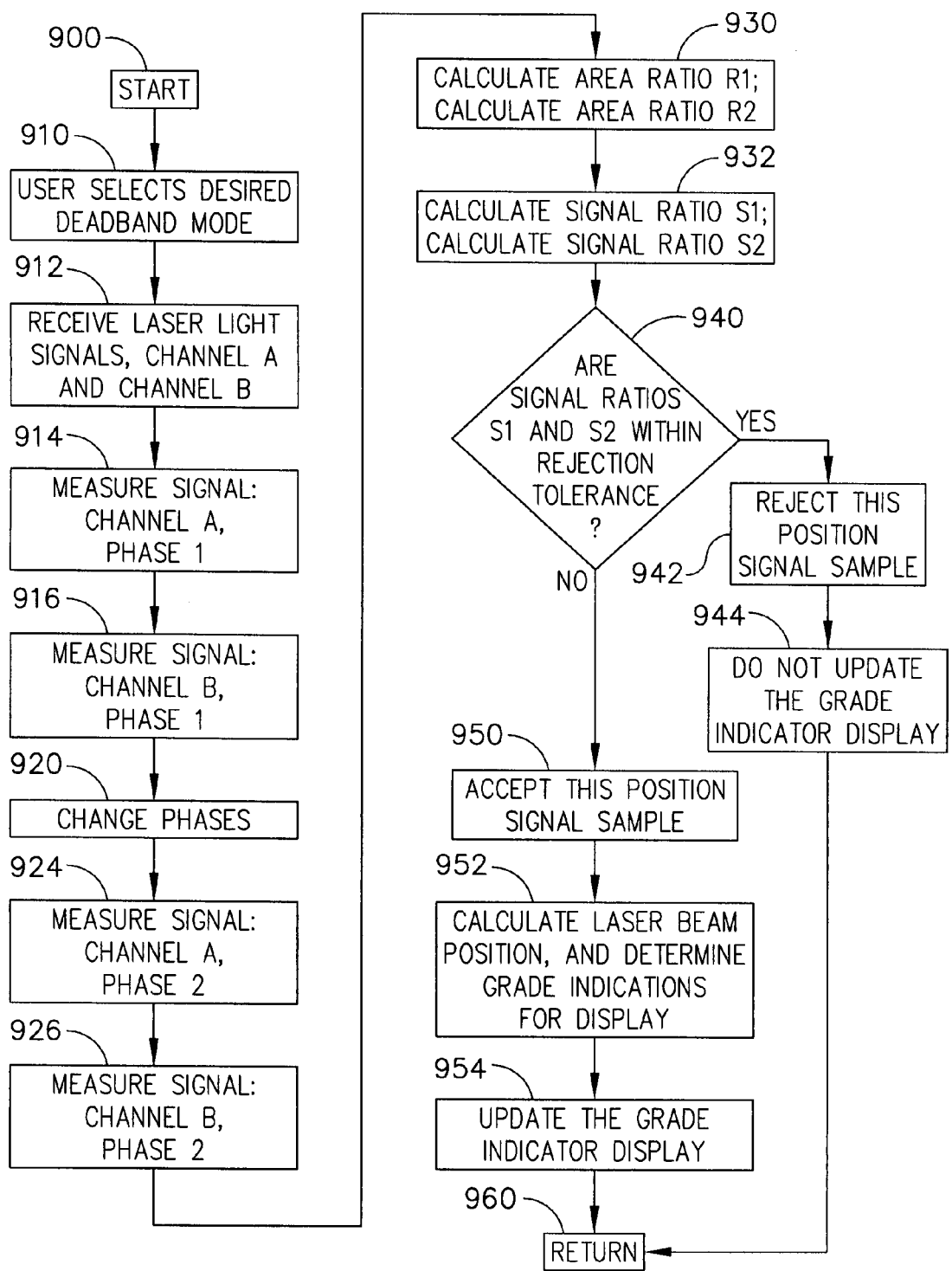
FIG. 33 is a flow chart that depicts some of the important logical steps for a first "reflection rejection" methodology of the present invention, in which the photocell areas can be switchably electrically connected during operation to create at least two separate channels of signals.

The processing unit for the laser receiver will implement a software algorithm that can be used in the reflection rejection methodology of the present invention. Referring now to FIG. 33, a flow chart that uses a "ping-pong" set of connection phases is described, starting at a step 900. At a step 910, the user selects the desired deadband mode. After that occurs, the receiver unit is ready for operation, and at a step 912 receives laser light signals, which produce electrical output signals for Channel A and Channel B. (Note that Channel A and Channel B would typically be two separate electrical signals, although their physical manifestations could be along a single wire or fiber, in which the signals are multiplexed.)

A step 914 now measures the signal strength for phase 1, Channel A. A step 916 now measures the signal strength for Channel B, during phase 1. The next step is a step 920 which changes the connection phases. To change the connection phases, it is typical to run the electrical output signals through a set of solid state switches, so that certain of the electrical output signals will be directed, for example, to Channel A during phase 1, but then to Channel B during phase 2. It will be understood that "phase 1" and "phase 2" can represent two different sampling intervals of the laser light signal, and that these sampling intervals, for example, can occur at predetermined (and perhaps fixed) time intervals, or perhaps strictly upon the occurrence of the laser beam actually impacting the photosensors of the laser receiver (in which the actual timing is completely outside the control of the processing circuit of the laser receiver).

In other words, an electrical switching circuit is typically used to direct the electrical output signals from the photosensors to a "first set of destinations" during a "first sampling interval" of the laser light signal, and then to a "second set of destinations" during a "second sampling interval" of that laser light signal. This terminology is used in some of the claims herein. In the above example, Channels A and B are the "destinations;" however, the electrical switching circuit determines which of the electrical output signals from the photosensors get directed to Channel A during phase 1 and which get directed to Channel A during phase 2—i.e., they won't be the same signals for both phases. The same is true for Channel B.

A step 924 now measures the signal strength for Channel A, during phase 2, and a step 926 measures the signal strength for Channel B, also during phase 2. It should be remembered that phase 2 represents a second impact of the laser light on the photocells of the laser receiver, while phase 1 represents the first impact of the laser light on the same photocells of that receiver. (Or, if the laser transmitter emits a continuous non-moving beam—or plane—of laser light, phase 1 represents a first sample acquired at a first instant or time interval, and phase 2 represents a second sample acquired at a second instant or time interval.)

A step 930 now calculates the numeric values for the area ratios R1 and R2. These, of course, can be fixed values stored in memory for the electronics of a particular known laser receiver unit. Assuming the user has only a certain number of different deadband modes, then there can be only a limited number of different area ratio values for R1 and R2. For example, EQUATIONS #18 and #19 show such area ratios for a relatively wide deadband, while EQUATIONS #20 and #21 show the area ratios R3 and R4 for a laser receiver unit that is operating under a relatively narrow deadband mode.

A step 932 now calculates the numeric values for the signal ratio S1 and the signal ratio S2. This is based on equations such as EQUATIONS #22 and #23, discussed above. A decision step 940 now determines if the signal ratios 51 and S2 are within the rejection tolerance. If the answer is YES, then a step 942 rejects this position signal sample, and a step 944 does not update the laser strike position on the grade indication display on the laser receiver unit. The logic flow now is directed to a "RETURN" step at 960.

On the other hand, if the signal ratios S1 and S2 are not within the rejection tolerance, then a step 950 will accept this position signal sample, and the following two steps 952 and 954 will respectively calculate the laser beam position and determine the grade indications for the display. The grade indicator display then will be updated to indicate the relative elevation of the laser receiver compared to the received laser light beam (e.g., above grade, below grade, or on-grade). After that has occurred, the logic flow is directed to the RETURN step 960. The entire process is now repeated after the next two connection phases of laser light impacts have been received (or sampled) by the laser receiver unit.

It should be noted that the term "rejection tolerance" is a numeric value that can be selected by the designer of the laser receiver, or it can be a user-selectable value, if desired. The rejection tolerance could provide a very "narrow" rejection tolerance, in which the numeric values for the signal ratios would have to be almost exactly the same as the numeric values for the area ratios before a position signal sample is rejected. These numeric values can be determined empirically by testing a new design laser receiver, or they can be values that the system designer can make flexible and perhaps offer the user several different possible rejection tolerance values.

The "rejection tolerance" may typically consist of a plus or minus percentage of the nominal area ratio, for example, +5%. However, the "rejection tolerance" may be any range of values desired by the receiver system designer, and it does not necessarily need to be symmetrical about the nominal value; moreover it could be in engineering units of a numeric ratio, rather than a percentage.

It should also be noted that the laser light beam could, in some operating conditions, be directly on-grade at the receiver and perhaps cover the entire set of photocell areas of a particular photocell array. When that occurs, then it might be possible for the numeric values for the signal strength ratios S1 and S2 to be virtually the same as the numeric values for the area ratios R1 and R2, but not be caused by actual reflections. This would depend on a couple factors, and especially the receiver's distance from the laser transmitter and size of the laser spot as it impacts the photocell array. This situation would require the photocell array to be entirely covered by the laser spot, and even then it is not always likely that the signal ratios S1 and S2 will be within the rejection tolerance as compared to the area ratios R1 and R2. If this situation is a concern for a particular receiver design, then the operating software for the flow chart of FIG. 33 could have an additional step that does not reject a position signal sample if a predetermined number of consecutive rejections has occurred, for example. This occurrence could indicate that it is not a reflection that is being received by the laser receiver unit, but instead is an actual laser spot that is directly on-grade. This would be a matter of design choice, and careful consideration would have to be given by the system designer as to this particular aspect of the laser receiver unit's operational capabilities. It probably is not a concern for most job site setups, i.e., using a transmitter with a relatively "narrow" laser beam diameter.

Figure 34:
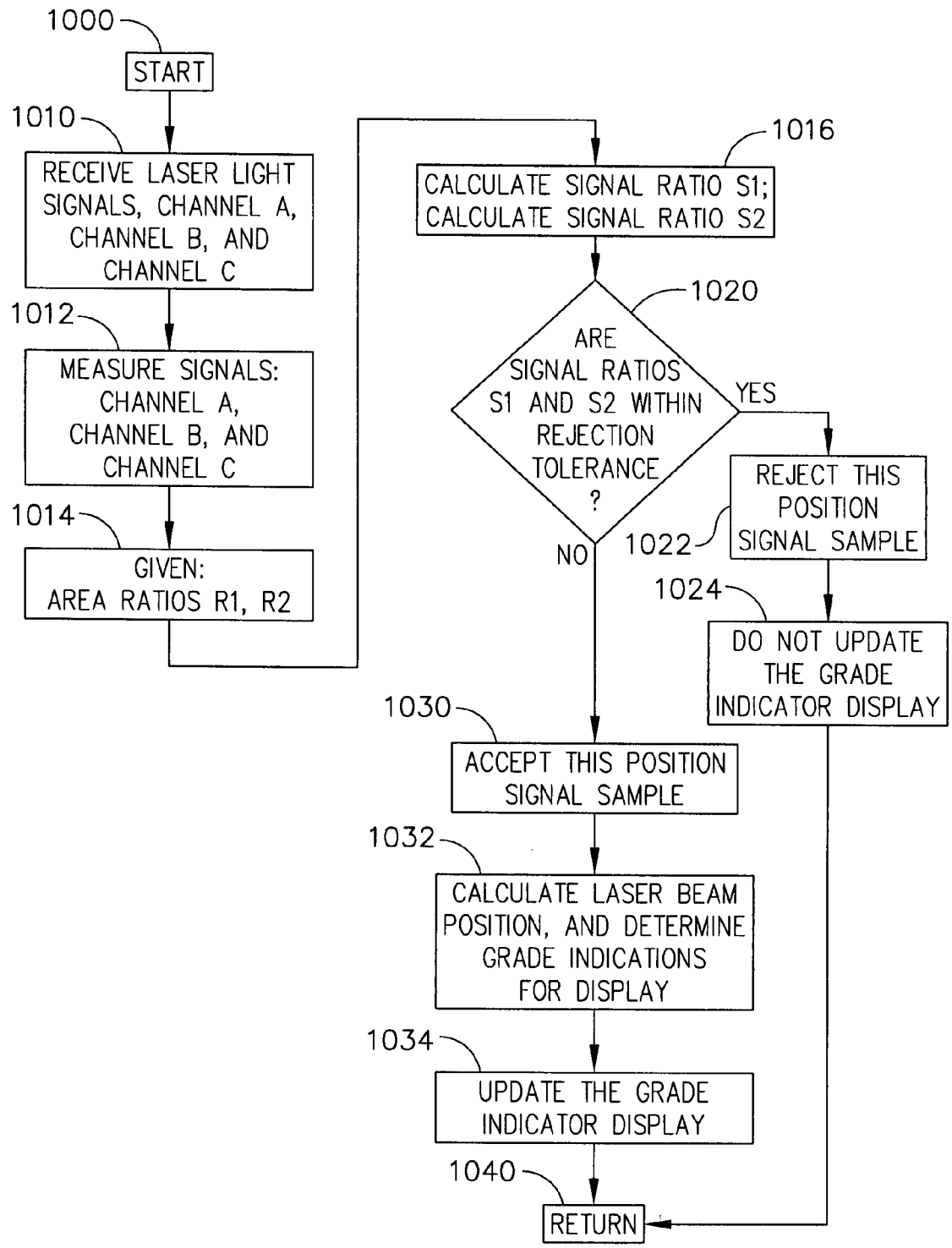
FIG. 34 is a flow chart that depicts some of the important logical steps for a second "reflection rejection" methodology of the present invention, in which the photocell areas are "hard-wired" to create three separate channels of signals.

Referring now to FIG. 34, the flow chart starts at a step 1000, and at a step 1010 laser light is received. The photocell signals are output at this point, and it is assumed that there are three separate channels being output (in parallel); in the flow chart of FIG. 34, these channel signals are referred to as Channels A, B, and C.

A step 1012 now measures these signal strengths for Channels A, B, and C. A step 1014 now inspects the numeric values for the area ratios R1 and R2, which would typically be given numeric values for a fixed area photocell configuration (although an adjustable deadband feature could vary these ratios). A step 1016 now calculates the numeric values for the signal ratio S1 and the signal ratio S2, which is based on the EQUATIONS #24 and #25 discussed above.

A decision step 1020 now determines if the signal ratios S1 and S2 are within the rejection tolerance. If the answer is YES, a step 1022 rejects this position signal sample, and a step 1024 does not update the laser strike position on the grade indicator display. The logic flow is now directed to a RETURN step 1040.

On the other hand, if the signal ratios S1 and S2 are not within the rejection tolerance, then a step 1030 accepts this position signal sample. A step 1032 now calculates the laser beam position and determines the grade indications for the indicator display of the laser receiver unit. A step 1034 now updates the grade indicator display to indicate the relative elevation of the laser receiver compared to the received laser light beam (e.g., above grade, below grade, or on-grade). The logic flow then is directed to the RETURN step 1040.

This flow chart of FIG. 34 will be useful for the embodiments that use the split-cell configuration illustrated in FIGS. 31 and 32, and also the "hard-wired" photocell configuration of FIG. 30. No "ping-pong" methodology is required or expected when using the flow chart of FIG. 34. At the same time, at least three signal channels are expected for determining the signal strength ratios S1 and S2. This methodology could also be used for laser transmitters that emit a continuous beam (or plane) of laser light which is continuously impacting the receiver unit, and thus such laser light could be sampled at leisure.

It will be understood that the present invention generally has been described herein as being used to detect modulated "laser" light. However, other forms of modulated light energy can also be detected by using the principles of the present invention. Various forms of modulated electromagnetic energy can be detected by various types of photosensors, and the present invention can often be used to detect such modulated energy transmissions regardless as to whether or not the energy is in the form of a laser beam. For example, "regular" (non-laser) light emitting diodes (LEDs) could be used to generate modulated light signals, which certainly could be detected by the present invention. Moreover, non-visible light wavelengths also can be detected by the present invention, so long as the proper photosensors are employed. Finally, for the reflection rejection embodiments, the laser light beam need not necessarily be modulated.

It will also be understood that the logical operations described in relation to the flow charts of FIGS. 22, 23, 24, 33, and 34 can be implemented using sequential logic, such as by using microprocessor technology, or using a logic state machine, or perhaps by discrete logic; it even could be implemented using parallel processors. One preferred embodiment may use a microprocessor or microcontroller (e.g., microcontroller 280) to execute software instructions that are stored in memory cells within an ASIC. In fact, the entire microcontroller 280 along with RAM and executable ROM may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIGS. 22-24 and 33-34, and discussed above, could be somewhat modified to perform similar, although not exact, functions without departing from the principles of the present invention. The exact nature of some of the decision steps and other commands in these flow charts are directed toward specific future models of modulated laser light detectors (e.g., those manufactured by Apache Technologies, Inc.) and certainly similar, but somewhat different, steps would be taken for use with other brands of modulated laser light detectors in many instances, with the overall inventive results being the same.

An earlier patent assigned to Apache Technologies, Inc. discusses another laser light detector that detects modulated laser light. This patent is titled "MODULATED LASER LIGHT DETECTOR," and was filed on Oct. 29, 2003 under Ser. No. 10/695,673, now U.S. Pat. No. 7,012,237; and is incorporated herein by reference in its entirety. All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A method for detecting a laser light beam, said method comprising:
   (a) receiving a laser light signal, and converting said laser light signal into a plurality of electrical signals by use of a plurality of photosensors;
   (b) determining a signal strength of each of said plurality of electrical signals;
   (c) determining an active sensing area of each of said plurality of photosensors; and
   (d) analyzing said signal strengths and said active sensing areas, and from that information, determining whether said received laser light signal substantially comprised reflected light, wherein:
      said step of determining a signal strength of each of said plurality of electrical signals comprises combining, in a predetermined electrical connection pattern, said plurality of electrical signals into two separate output signals; and
      said step of analyzing said signal strengths and said active sensing areas comprises:
         (i) calculating a first ratio of signal magnitudes of said two separate output signals;
         (ii) calculating a second ratio of a predetermined spatial pattern of said active sensing areas of the plurality of photosensors;
         (iii) determining whether numeric values for said first and second ratios are within a predetermined range of values, and if so, determining that said received laser light beam was reflected light.

2. The method as recited in claim 1, wherein the step of determining whether numeric values for said first and second ratios are within a predetermined range of values comprises comparing said numeric value for said first ratio to a predetermined tolerance of said numeric value for said second ratio.

3. The method as recited in claim 1, further comprising the step of: (e) determining a position on said predetermined spatial pattern where said laser light beam impacts against said plurality of photosensors, by analyzing the signal strengths of said plurality of electrical signals.

4. The method as recited in claim 3, further comprising the steps of:
   (f) displaying an updated indication of a position where the received laser light impacted on said spatial pattern of the plurality of photosensors, when said numeric values of said first and second ratios were not within said predetermined range of values for a last sample taken of the received laser light; and
   (g) rejecting the last sample taken of the received laser light and not displaying an updated indication of a position where the received laser light impacted on said spatial pattern of the plurality of photosensors, when said numeric values of said first and second ratios were within said predetermined range of values for the last sample taken of the received laser light.

5. A method for detecting a laser light beam, said method comprising:
   (a) receiving a laser light signal, and converting said laser light signal into a plurality of electrical signals by use of a plurality of photosensors;
   (b) combining said plurality of electrical signals into a Channel A signal and a Channel B signal, and determining signal strengths of both Channel A and Channel B signals;
   (c) determining at least one active sensing area of said plurality of photosensors that corresponds to generating the Channel A and Channel B signals;
   (d) calculating an area ratio R1 and an area ratio R2, based upon said active sensing areas of said plurality of photosensors;
   (e) calculating a signal ratio S1 and a signal ratio S2, based upon said signal strengths of said Channel A and Channel B signals; and
   (f) determining whether said ratios S1 and S2 are within a rejection tolerance of said ratios R1 and R2, and:
      (i) if not, updating a display to show a position where said laser light signal impacted said plurality of photosensors, for a last sample taken of the received laser light; and
      (ii) if so, rejecting the last sample taken of the received laser light, and not updating said display.

6. The method as recited in claim 5, wherein said rejection tolerance comprises one of:
   (a) a predetermined range of values of said ratios S1 and S2 compared to said ratios R1 and R2; and
   (b) a predetermined percentage tolerance above and below said ratios R1 and R2.

7. The method as recited in claim 5, further comprising the steps of:
   (g) directing individual of said plurality of electrical signals from said plurality of photosensors to a first set of destinations during a first sampling interval of said laser light signal, by use of an electrical switching circuit;
   (h) directing individual of said plurality of electrical signals from said plurality of photosensors to a second set of destinations during a second sampling interval of said laser light signal, by use of said electrical switching circuit;
   (i) during a "Phase 1" of operation, said first set of destinations comprises said Channel A signal and said Channel B signal;
   (j) during a "Phase 2" of operation, said second set of destinations comprises said Channel A signal and said Channel B signal; and
   (k) using a predetermined one of said individual of the plurality of electrical signals, from said plurality of photosensors, as part of Channel A during Phase 1, and as part of Channel B during Phase 2.

8. The method as recited in claim 5, further comprising the steps of:
   (g) directing individual of said plurality of electrical signals from said plurality of photosensors to a first set of destinations during a first sampling interval of said laser light signal, by use of an electrical switching circuit;
   (h) directing individual of said plurality of electrical signals from said plurality of photosensors to a second set of destinations during a second sampling interval of said laser light signal, by use of said electrical switching circuit;
   (i) during a "Phase 1" of operation, said first set of destinations comprises said Channel A signal and said Channel B signal;
   (j) during a "Phase 2" of operation, said second set of destinations comprises said Channel A signal and said Channel B signal; and
   (k) using a predetermined one of said individual of the plurality of electrical signals, from said plurality of photosensors, as part of Channel B during Phase 1, and as part of Channel A during Phase 2.

9. A laser light detector, comprising:
(a) a plurality of laser light photosensors, which generate a plurality of electrical signals when receiving laser light energy, said plurality of laser light photosensors each having an active sensing area; and
(b) a processing circuit that receives said plurality of electrical signals, said processing circuit being configured to:
(i) determine a signal strength of each of said plurality of electrical signals;
(ii) determine a physical size of said active sensing areas of said plurality of laser light photosensors; and
(iii) based on that information, determine whether said laser light energy substantially comprises reflected light;
wherein:
said received laser light energy comprises a laser light beam that, depending upon a physical orientation of said laser light receiver and said laser light transmitter, impacts at least one of said plurality of laser light photosensors;
a position of the laser light beam, as it impacts said at least one of said plurality of laser light photosensors, is determined by said processing circuit;
said plurality of laser light photosensors outputs at least two separate electrical signals that each have a magnitude that is dependent upon (i) a quantity of said active sensing areas that is impacted by said laser light beam, and (ii) a signal strength of said laser light beam as it impacts said active sensing areas; and
said processing circuit is further configured to:
(c) determine a first value that comprises a ratio of signal magnitudes of (i) a first of said at least two separate electrical signals and (ii) a second of said at least two separate electrical signals;
(d) determine a second value that comprises a ratio of said active sensing areas of said plurality of laser light photosensors; and
(e) compare said first value and said second value, and if said first value is within a predetermined range of values compared to said second value, then determine that the corresponding received laser light beam which produced that set of said at least two separate electrical signals was reflected light.

10. The laser light receiver as recited in claim 9, wherein said received laser light energy comprises a laser light beam that is generated by one of:
(a) an external rotating laser light transmitter; and
(b) an external modulated laser light transmitter.

11. The laser light receiver as recited in claim 9, further comprising a display that indicates relative elevation of said laser light receiver compared to said received laser light beam; wherein said processing circuit is further configured to:
(f) sample said received laser light beam, over a predetermined time period;
(g) indicate a relative elevation of said sampled laser light beam, as determined by said processing circuit, when said first value is not within said predetermined range of values compared to said second value, for that most recent sample of said received laser light beam; and
(h) not indicate a relative elevation of said sampled laser light beam, as determined by said processing circuit, when said first value is within said predetermined range of values compared to said second value, thereby effectively rejecting that most recent sample of said received laser light beam.

12. The laser light receiver as recited in claim 11, wherein said predetermined range of values of said first value compared to said second value comprises a percentage tolerance of said second value.

13. The laser light receiver as recited in claim 12, further comprising at least one switching circuit that is controlled by said processing circuit, wherein:
(a) said at least one switching circuit directs individual output electrical signals from said plurality of laser light photosensors to a first set of destinations during a first sampling interval of said laser light beam;
(b) said at least one switching circuit directs individual output electrical signals from said plurality of laser light photosensors to a second set of destinations during a second sampling interval of said laser light beam;
(c) said first set of destinations comprises a "Channel A" and a "Channel B" of said at least two separate electrical signals during a "Phase 1" of operation of the laser light receiver;
(d) said second set of destinations comprises a "Channel A" and a "Channel B" of said at least two separate electrical signals during a "Phase 2" of operation of the laser light receiver;
(e) at least one of the individual output electrical signals from said plurality of laser light photosensors is used by Channel A during Phase 1, and is used by Channel B during Phase 2; and
(f) at least one of the individual output electrical signals from said plurality of laser light photosensors is used by Channel B during Phase 1, and is used by Channel A during Phase 2.

* * * * *